(12) United States Patent
Honda et al.

(10) Patent No.: US 7,723,664 B2
(45) Date of Patent: May 25, 2010

(54) IMAGING APPARATUS HAVING ELECTRON SOURCE ARRAY

(75) Inventors: Yuki Honda, Tokyo (JP); Masakazu Namba, Tokyo (JP); Yoshiyuki Hirano, Tokyo (JP); Saburo Okazaki, Tokyo (JP); Norifumi Egami, Tokyo (JP); Toshihisa Watabe, Tokyo (JP); Yoshiro Takiguchi, Tokyo (JP); Akira Kobayashi, Hamamatsu (JP); Shigeo Itoh, Mobara (JP); Masateru Taniguchi, Mobara (JP); Kazuhito Nakamura, Mobara (JP); Kenta Miya, Mobara (JP); Takahiro Niiyama, Mobara (JP); Yoshiyuki Okuda, Tsurugashima (JP)

(73) Assignees: Nippon Hoso Kyokai, Tokyo (JP); Hamamatsu Photonics K.K., Hamamatsu-shi (JP); Futaba Corporation, Tokyo (JP); Pioneer Corporation, Tokyo (JP)

( * ) Notice: Subject to any disclaimer, the term of this patent is extended or adjusted under 35 U.S.C. 154(b) by 178 days.

(21) Appl. No.: 12/123,987

(22) Filed: May 20, 2008

(65) Prior Publication Data
US 2008/0291308 A1 Nov. 27, 2008

(30) Foreign Application Priority Data
May 21, 2007 (JP) ............................. 2007-134790

(51) Int. Cl.
*H01J 29/04* (2006.01)
(52) U.S. Cl. .................... 250/208.1; 345/74.1; 345/75.2

(58) Field of Classification Search .............. 250/208.1, 250/214.1; 345/74.1, 75.2
See application file for complete search history.

(56) References Cited

U.S. PATENT DOCUMENTS

| 5,432,526 A | * | 7/1995 | Hyatt ........................... 345/87 |
| 5,488,386 A | | 1/1996 | Yamagishi et al. |
| 2006/0284683 A1 | * | 12/2006 | Ishii ........................... 330/295 |

FOREIGN PATENT DOCUMENTS

| JP | 6-176704 | 6/1994 |
| JP | 2004-134144 | 4/2004 |

OTHER PUBLICATIONS

U.S. Appl. No. 12/123,707, filed May 20, 2008, Honda et al.
U.S. Appl. No. 12/123,719, filed May 20, 2008, Namba et al.

* cited by examiner

*Primary Examiner*—Kiet T Nguyen
(74) *Attorney, Agent, or Firm*—Oblon, Spivak, McClelland, Maier & Neustadt, L.L.P.

(57) ABSTRACT

An imaging apparatus includes an electron emission array having electron sources arranged in matrix form and having a plurality of horizontal scan lines, a photoelectric conversion film opposed to the electron emission array, and a control and drive circuit configured to select one or more of the horizontal scan lines in a given video signal output period and to cause the electron sources included in the selected one or more horizontal scan lines to emit electrons toward the photoelectric conversion film to produce a video signal, wherein the control and drive circuit is configured to control electron emission of the electron emission array in a blanking period in response to a signal level of the video signal produced in the given video signal output period.

9 Claims, 33 Drawing Sheets

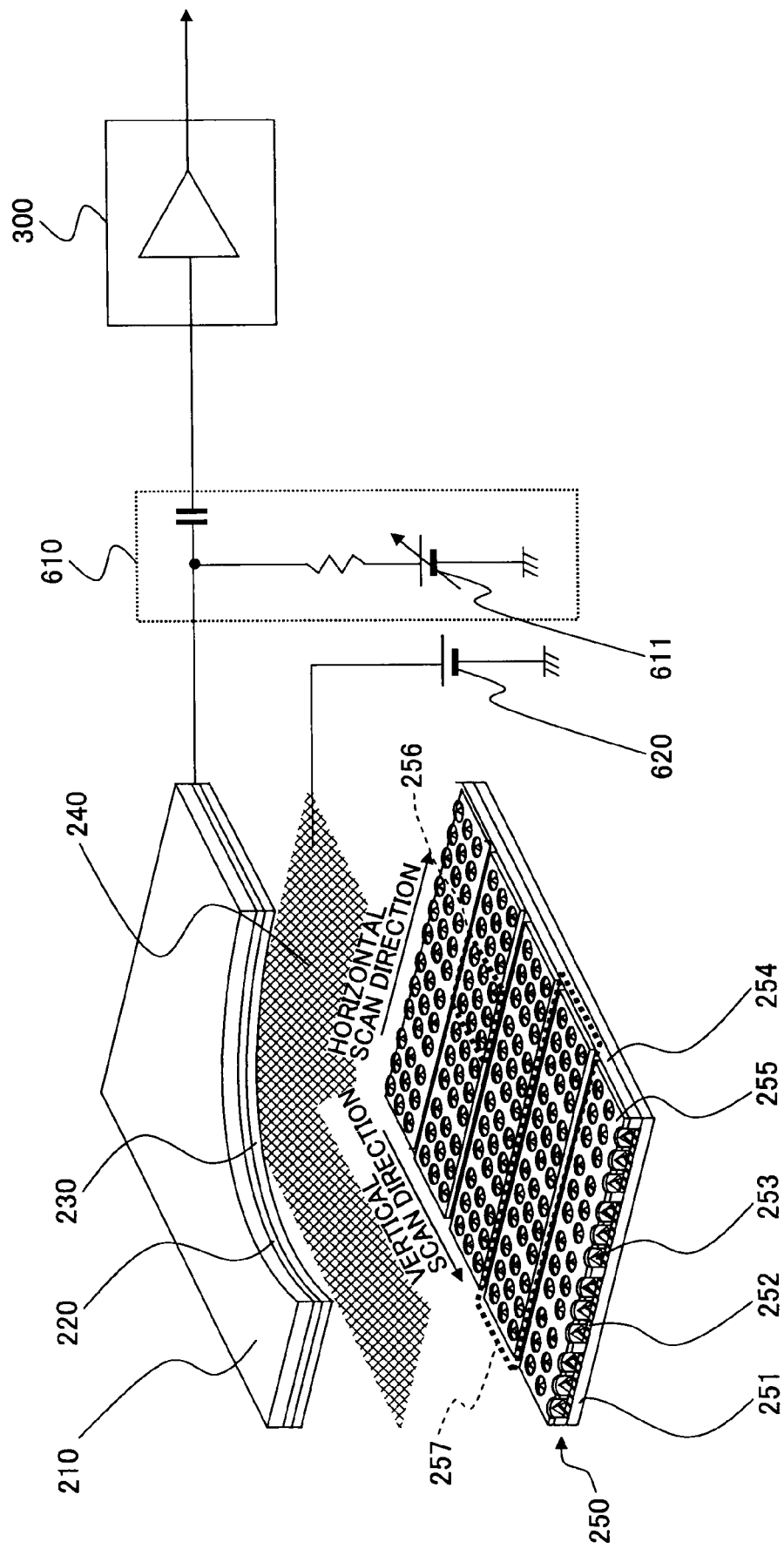

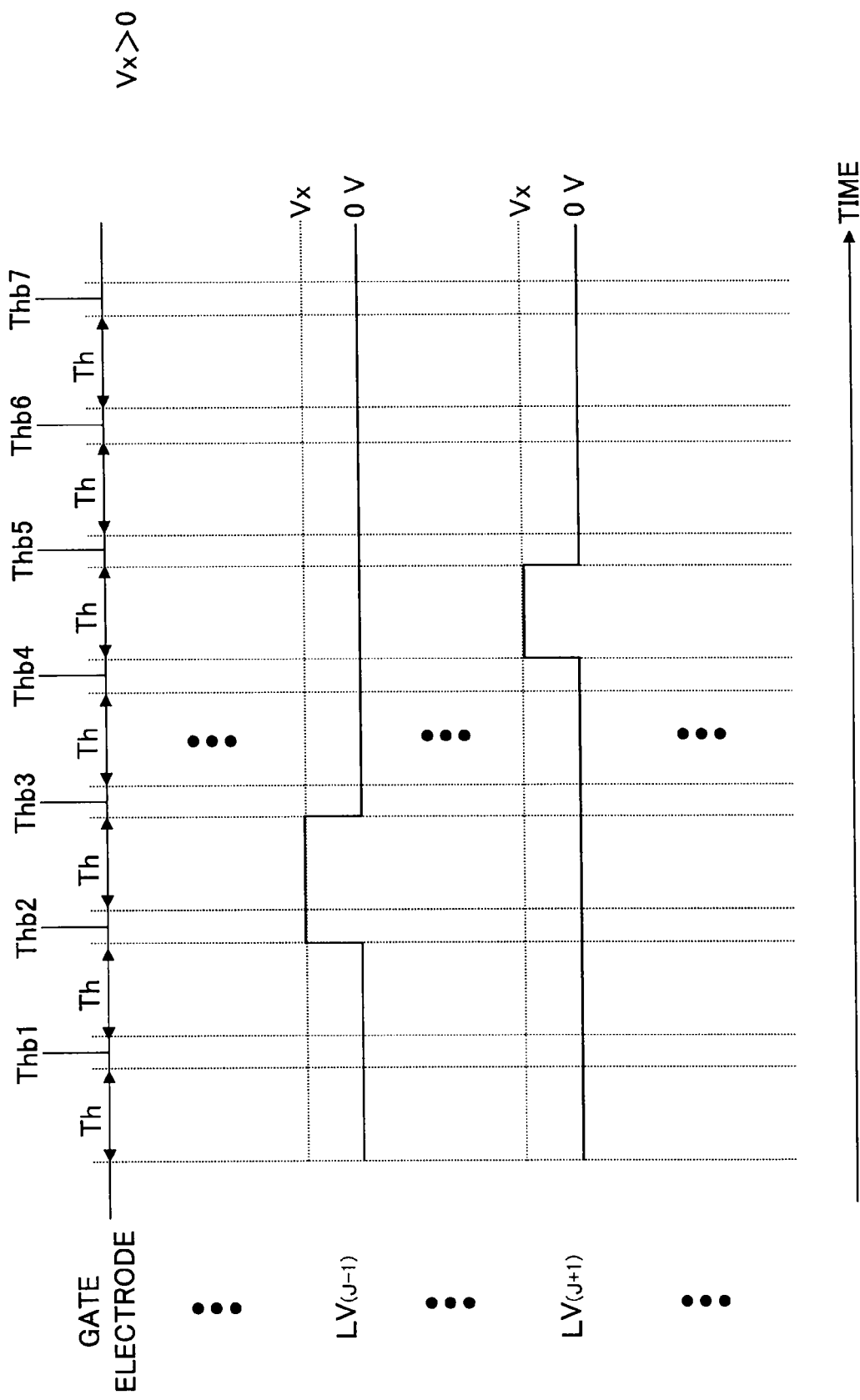

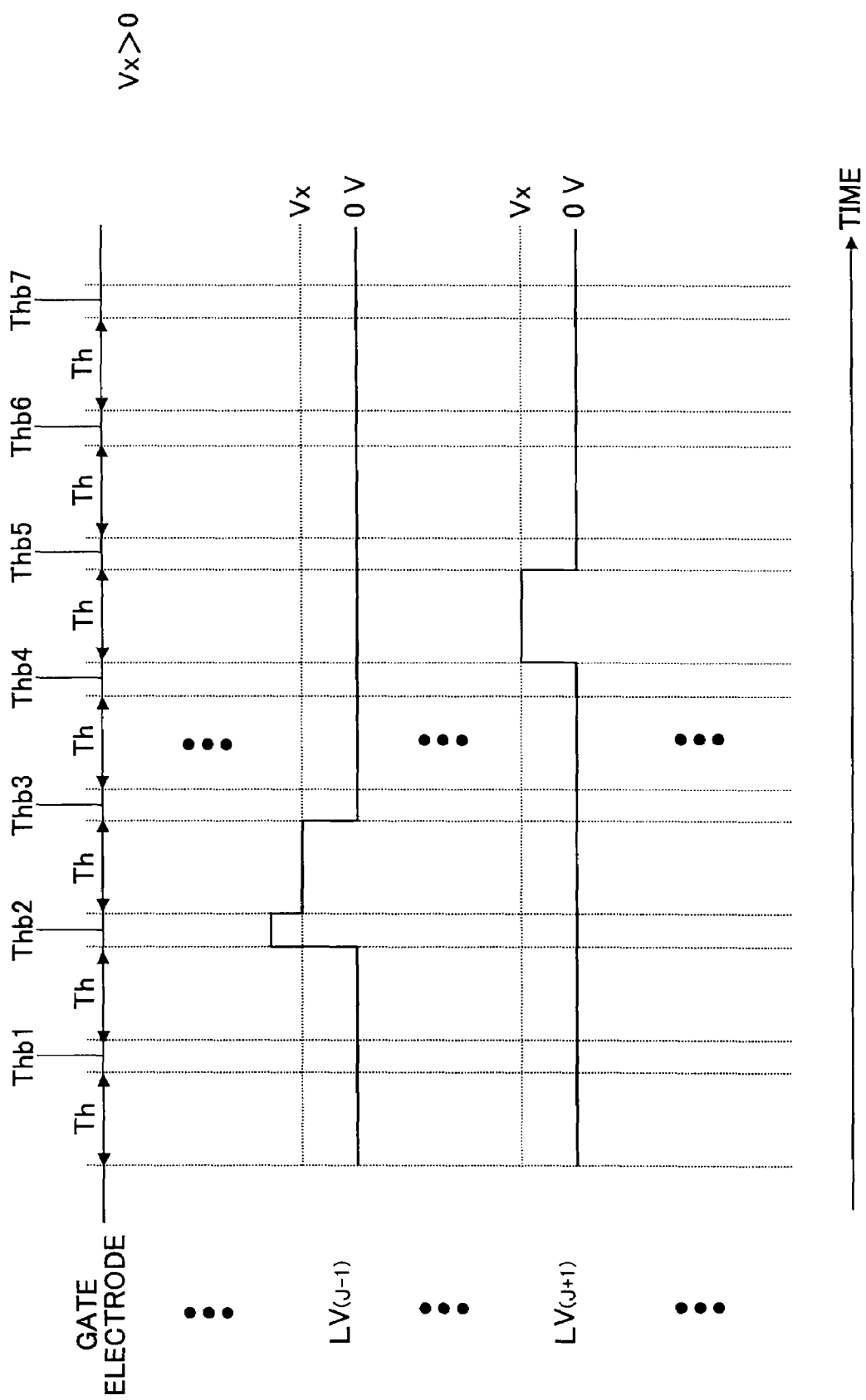

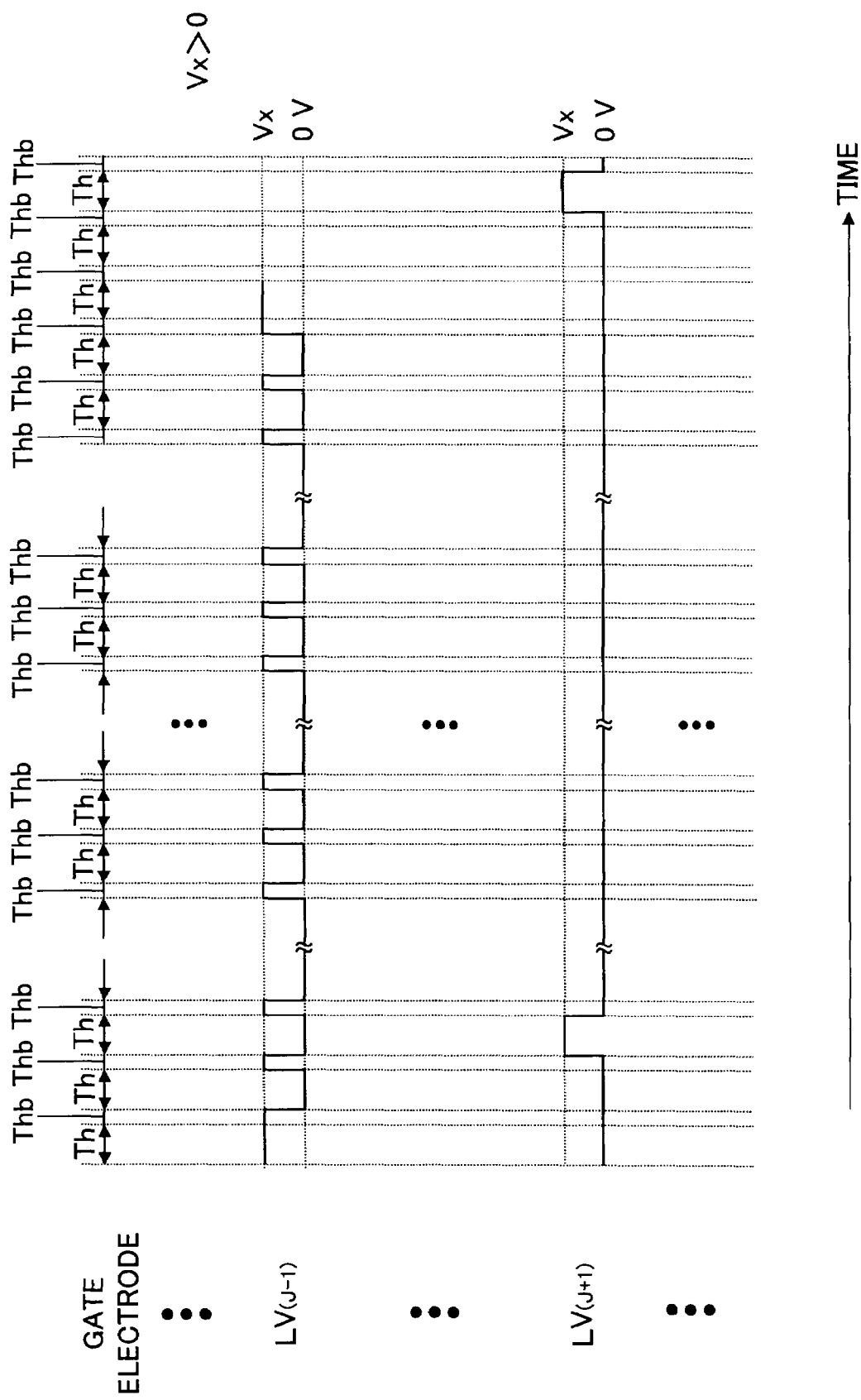

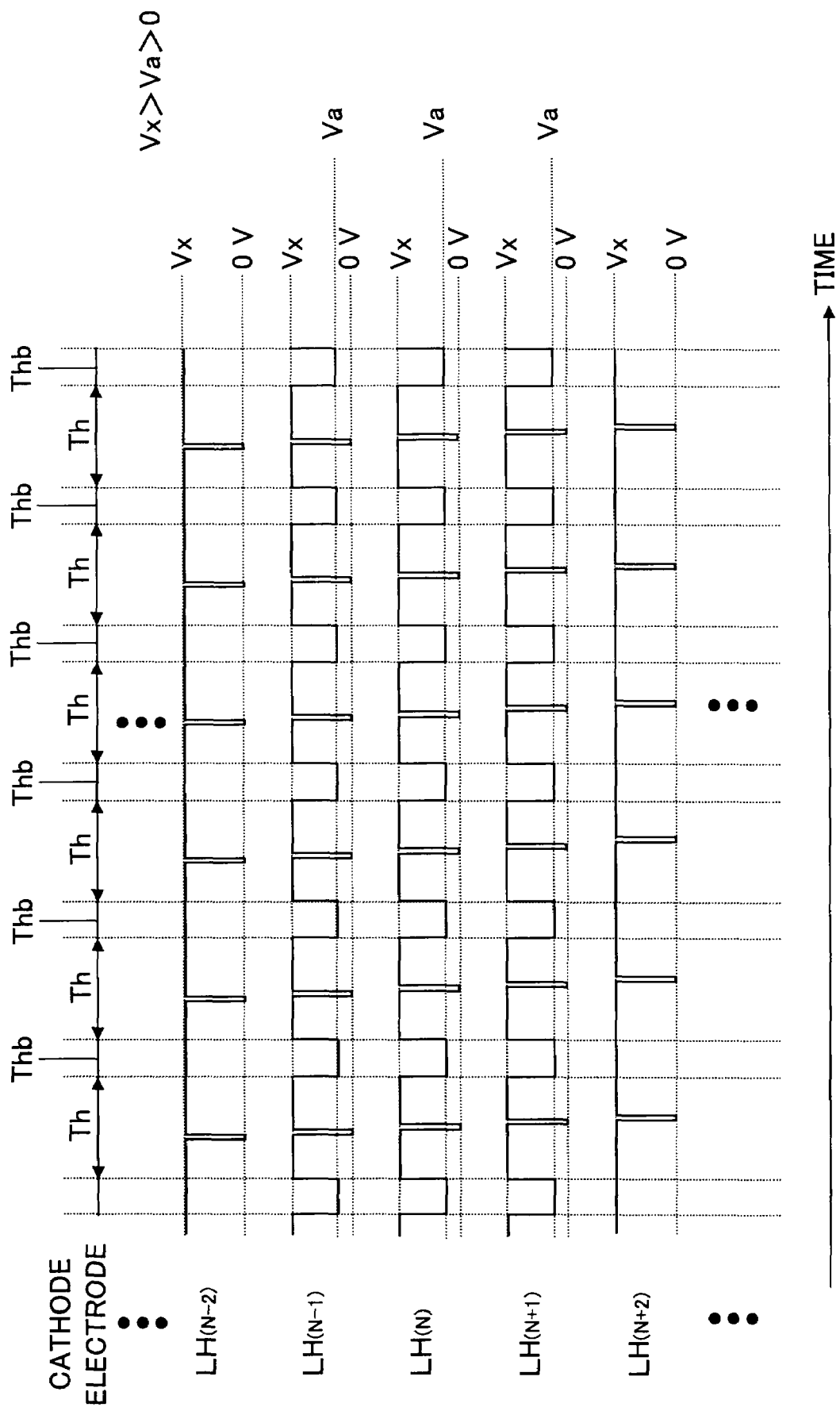

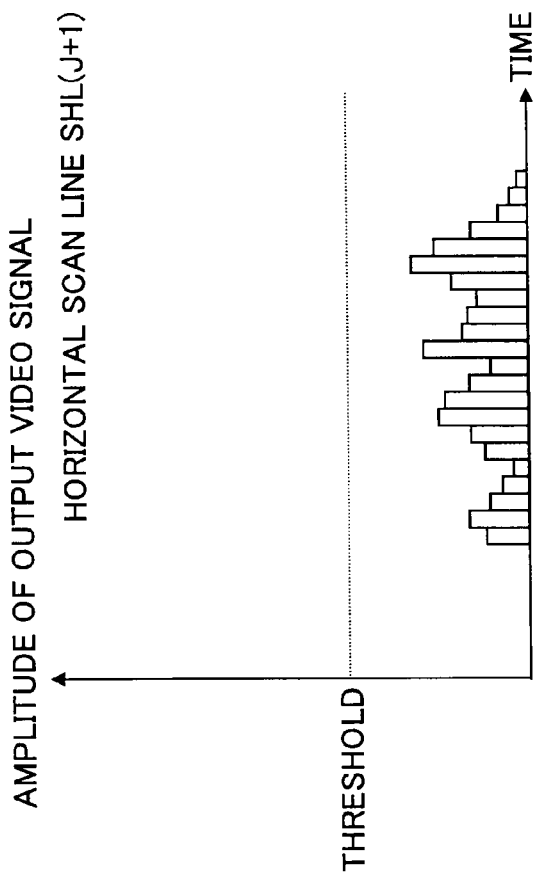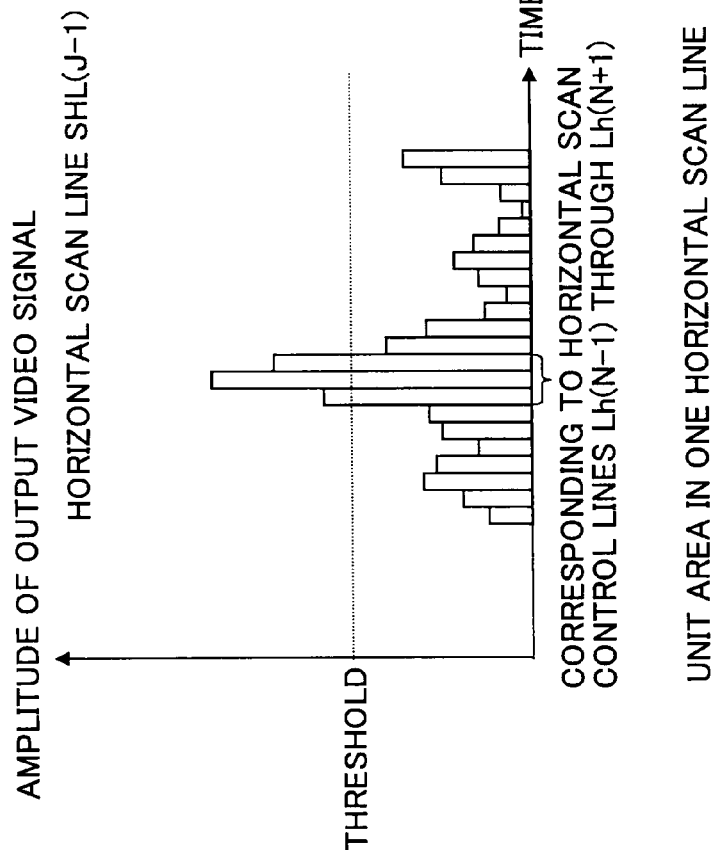
FIG.20A
FIG.20B

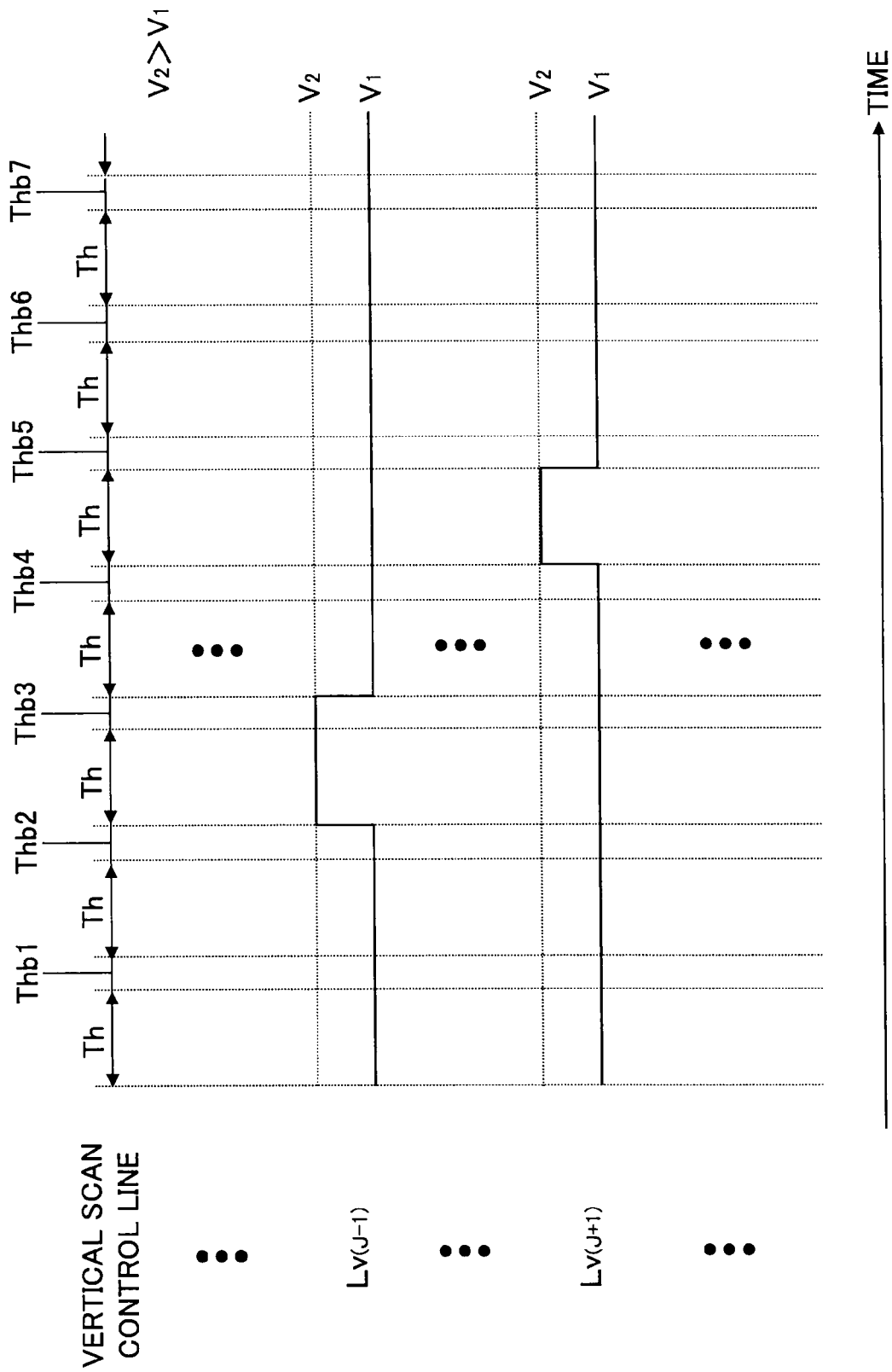

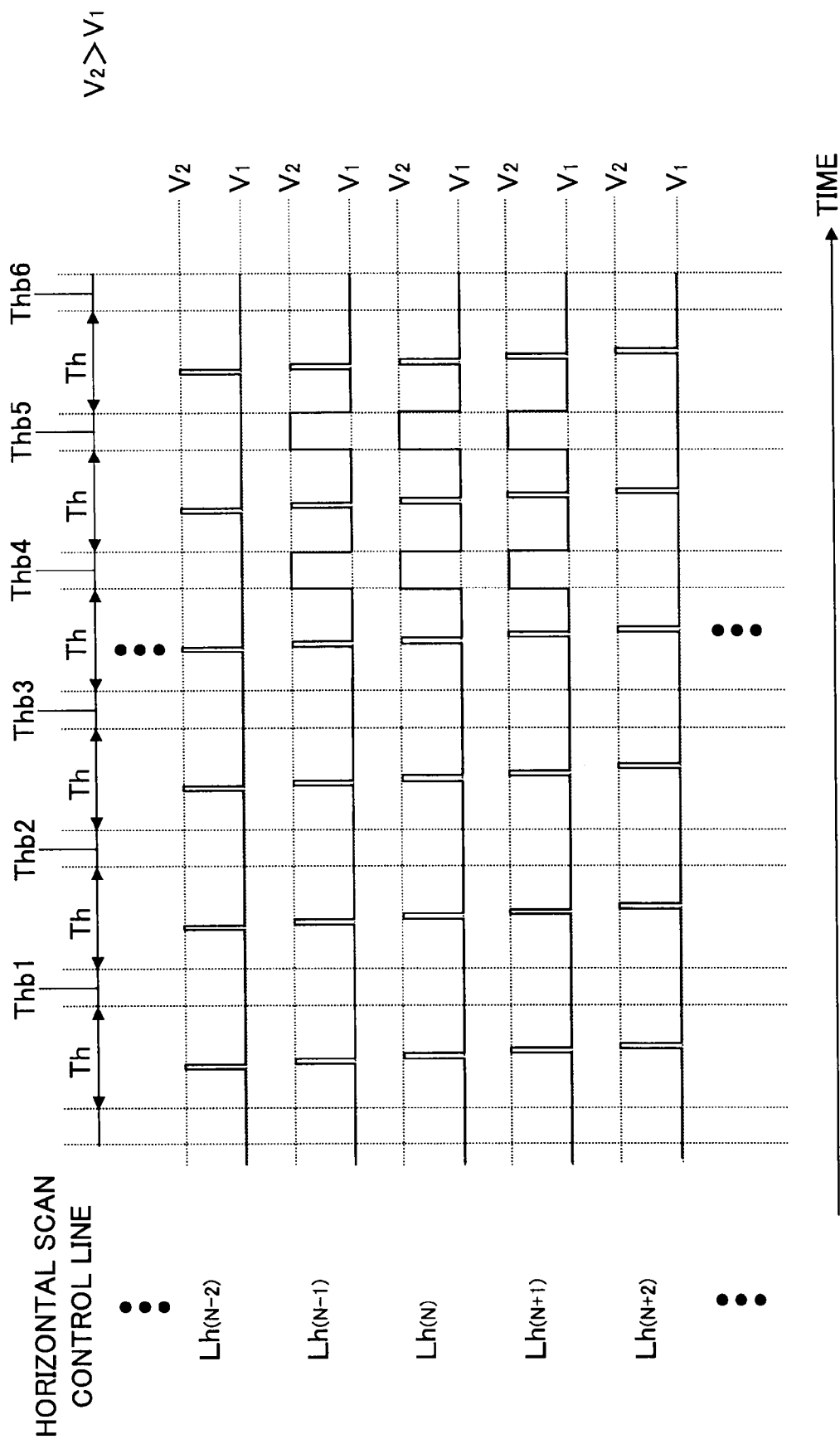

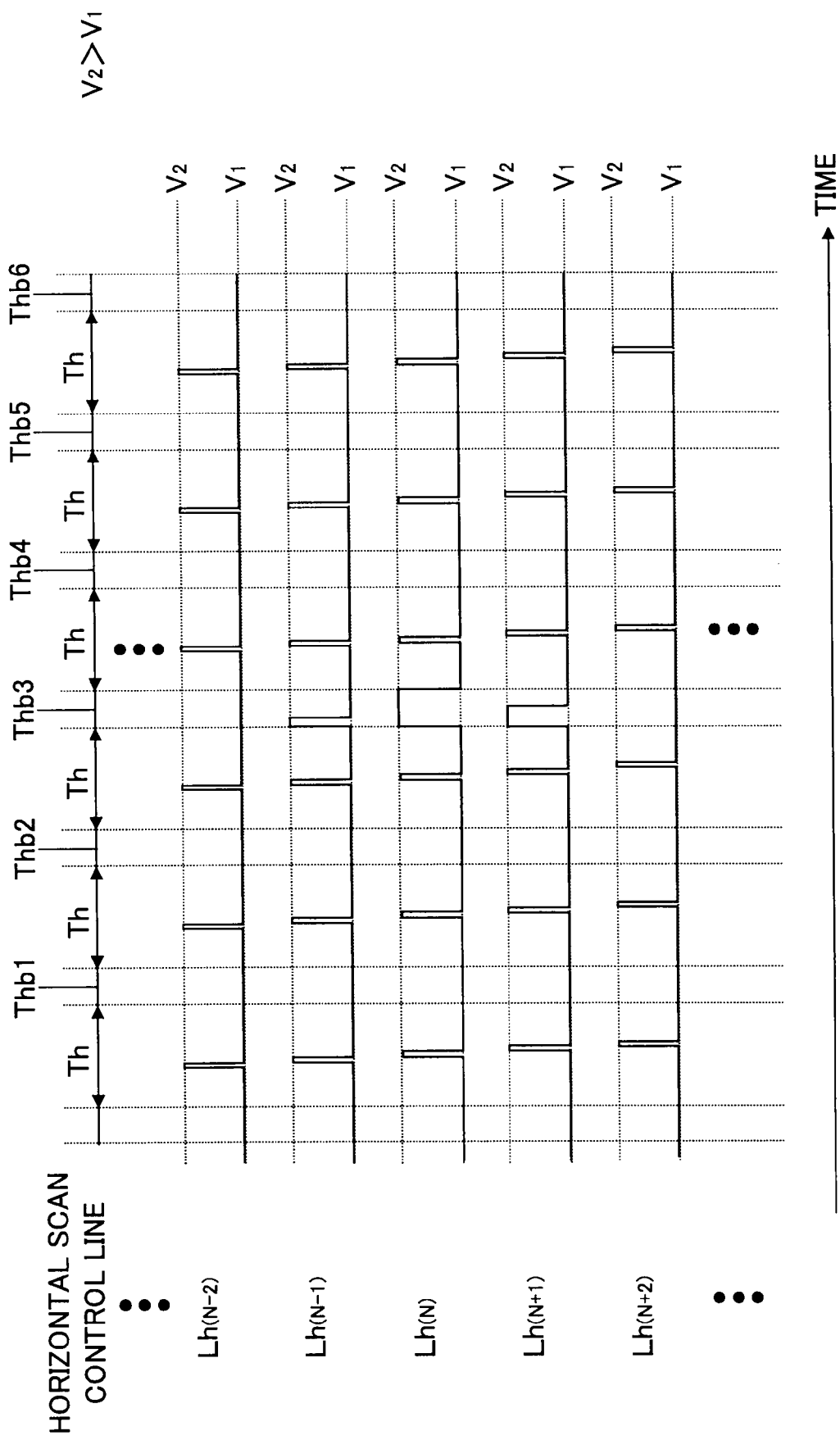

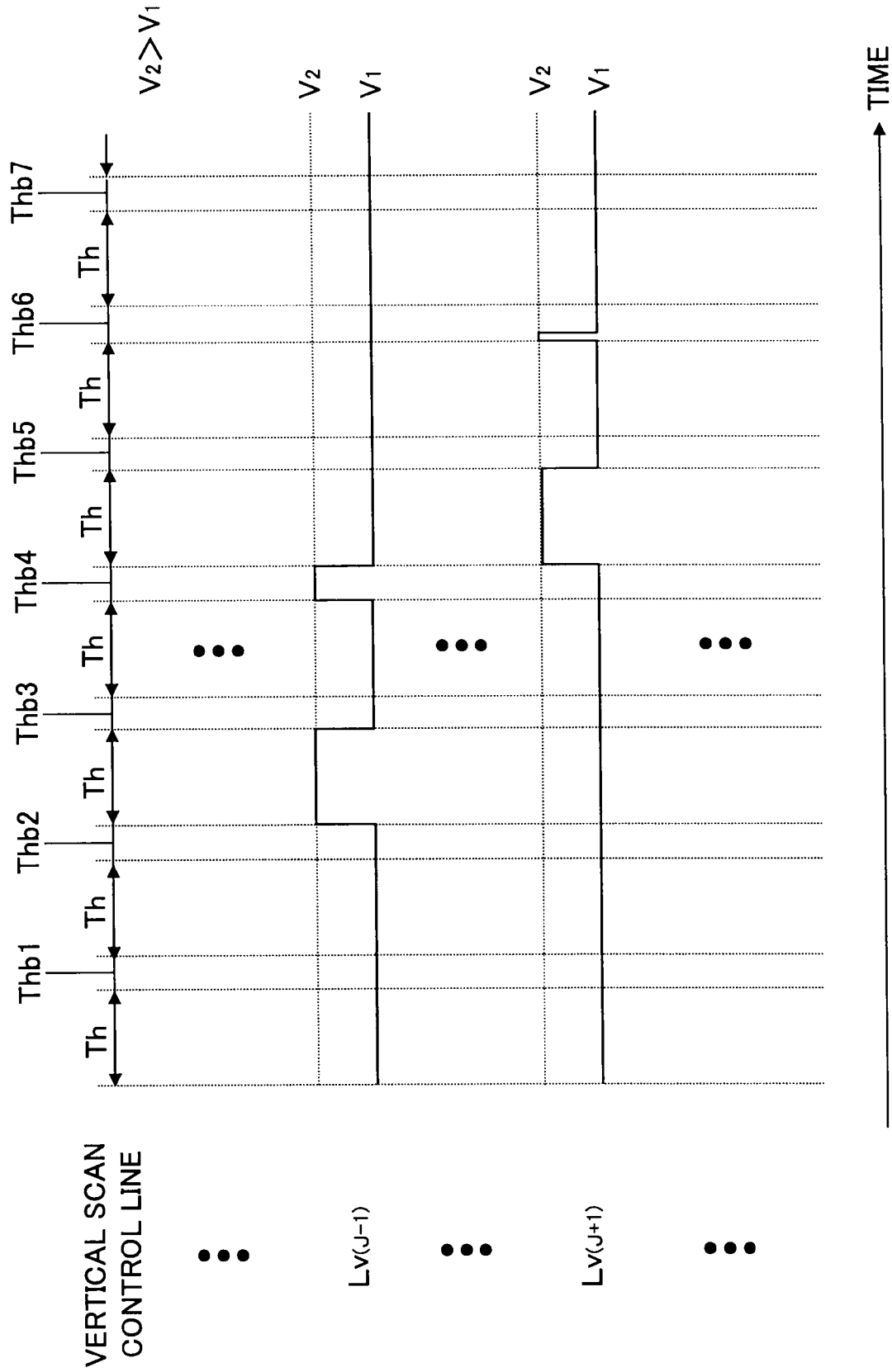

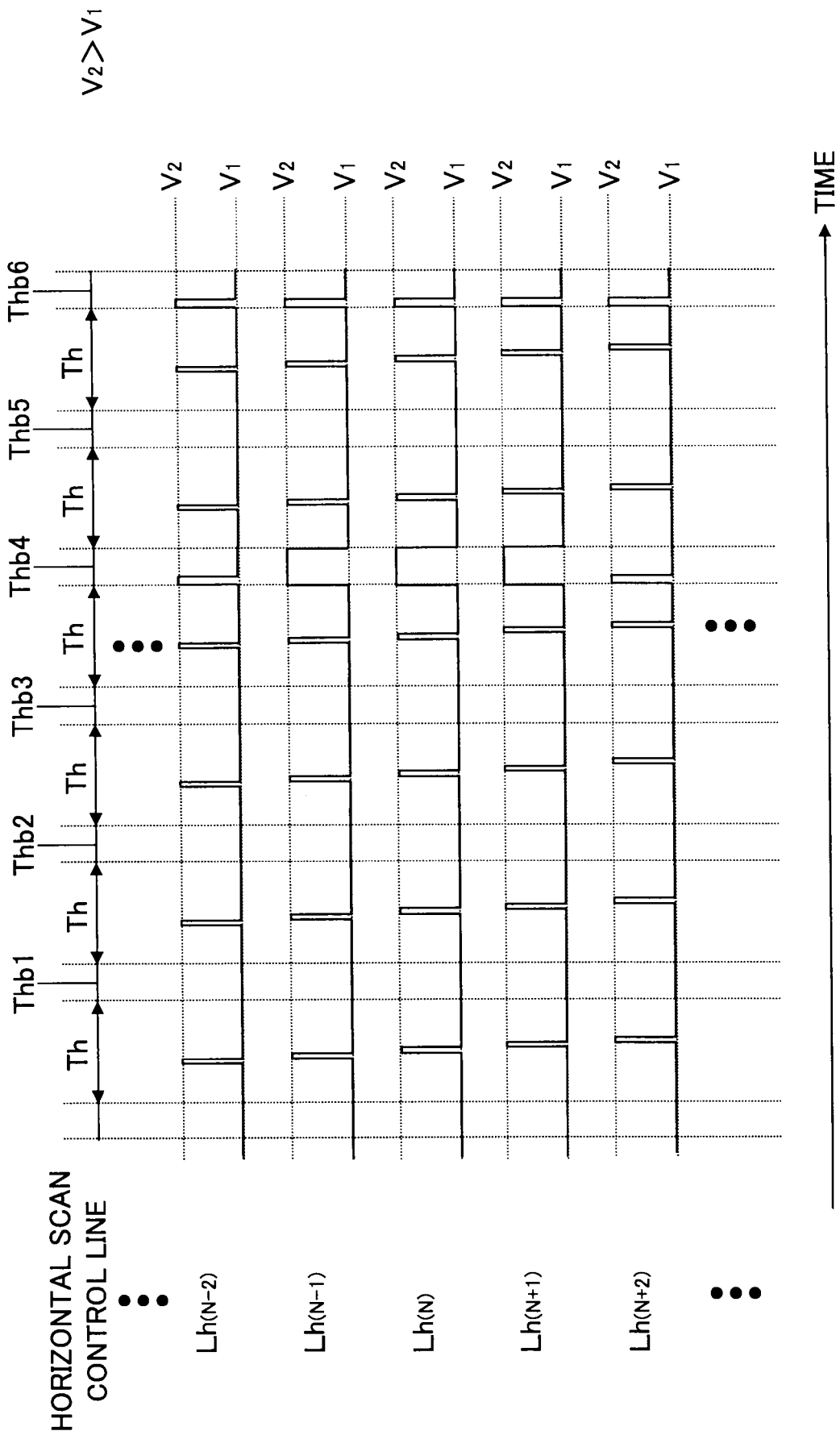

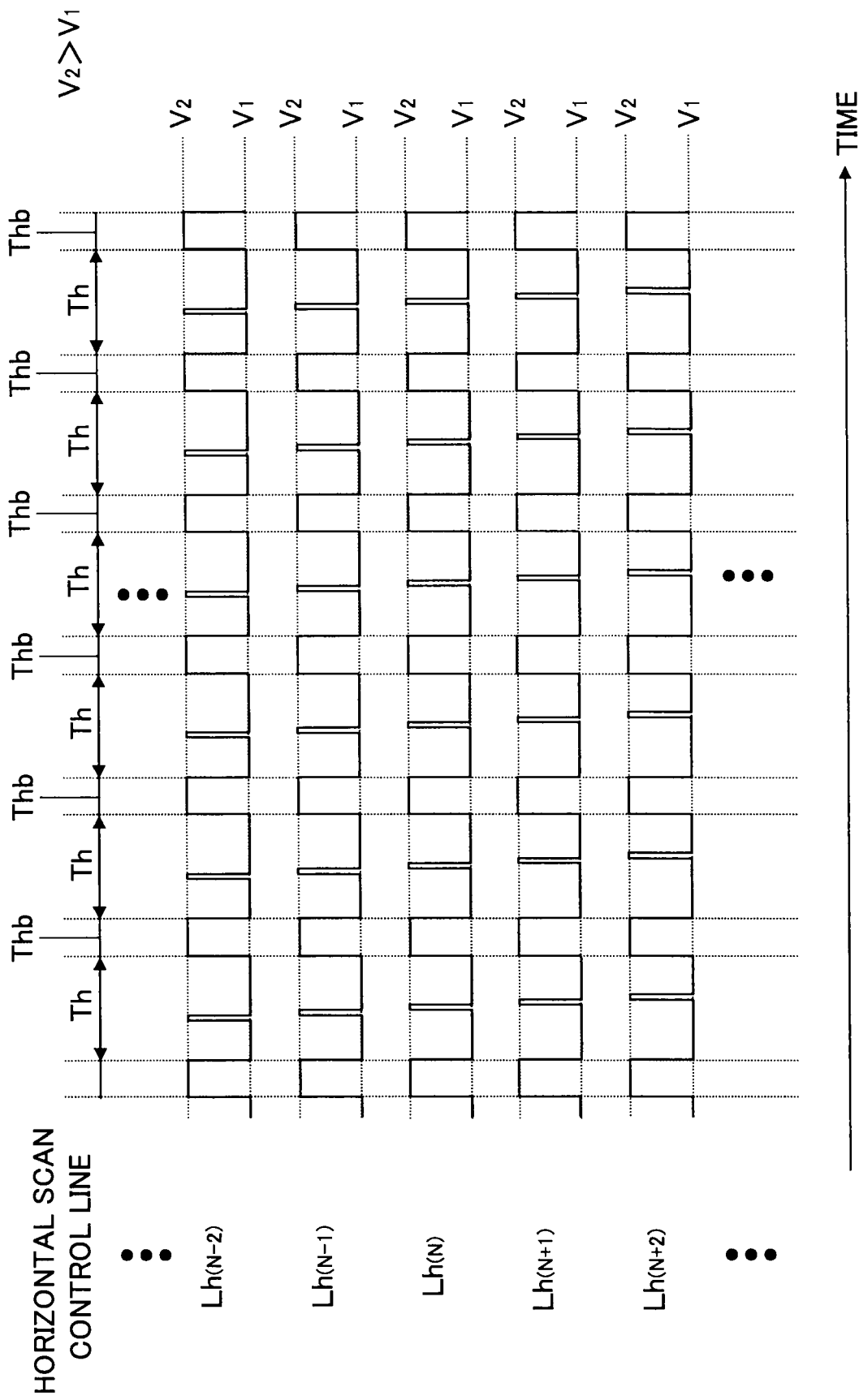

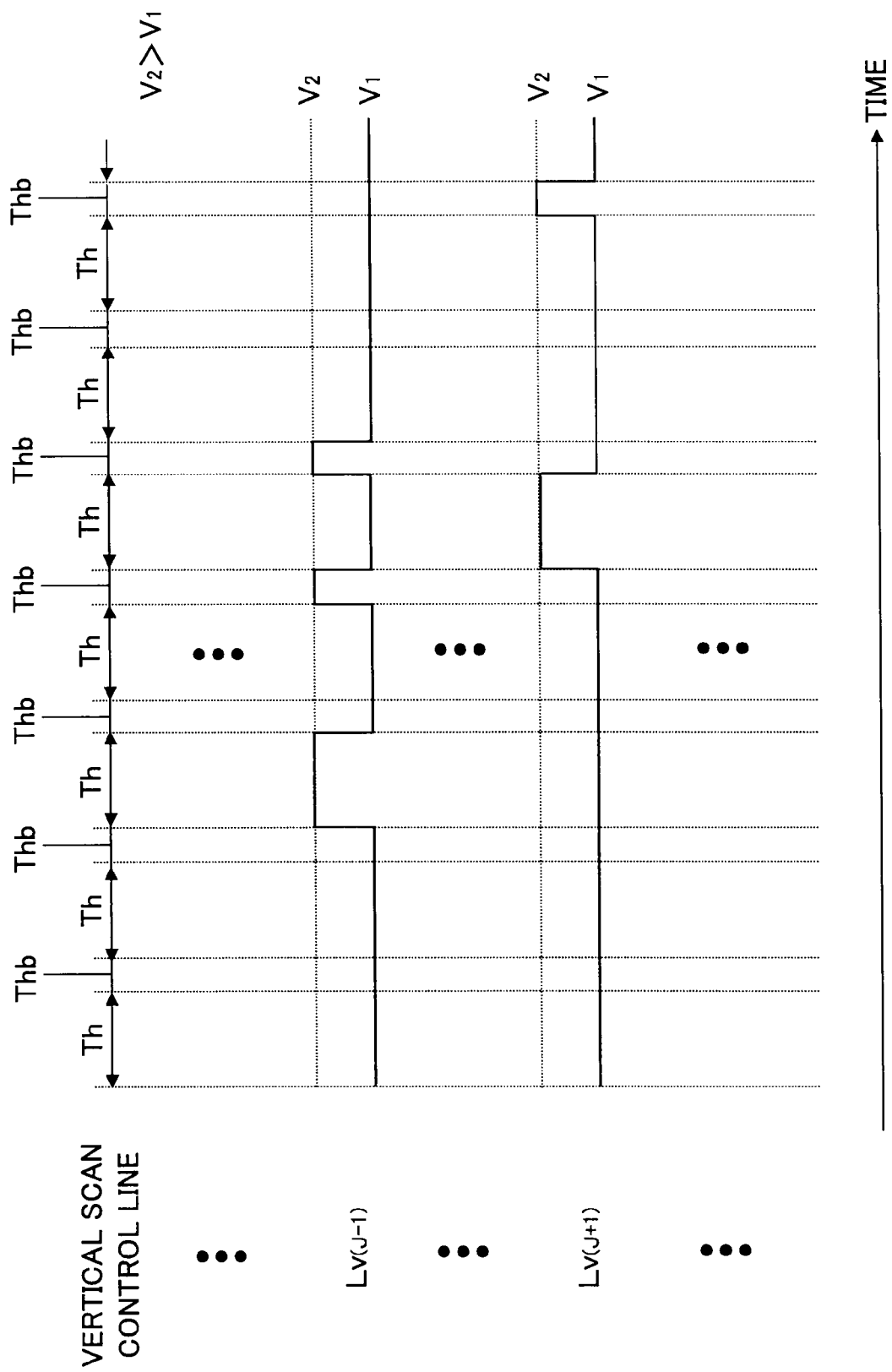

IMAGING APPARATUS HAVING ELECTRON SOURCE ARRAY

BACKGROUND OF THE INVENTION

1. Field of the Invention

The disclosures herein relate to an imaging apparatus provided with a photoelectric conversion film and an electron source array having electron sources arranged in matrix form wherein electrons are emitted from the electron source array during a video signal output period and a vertical blanking period.

2. Description of the Related Art

Research has been conducted for some time with respect to imaging apparatus that is provided with a photoelectric conversion film and an electron emission array having a matrix of electron emission sources, from which electrons are drawn out by an electric field without application of heat. This electron emission array has a plurality of Spindt-type emitters arranged in matrix form, which are opposed to the photoelectric conversion film across vacuum space. In such imaging device, holes that are generated and accumulated in the photoelectric conversion film in response to light arriving from an external source are read out by using electrons successively emitted from the Spindt-type emitter array, thereby producing a time sequence of video signals (see Patent Document 1).

When highly bright light enters a portion of the photoelectric conversion film of such an imaging apparatus, a large amount of holes will be accumulated in this portion of the photoelectric conversion film on its electron scan side, resulting in a potential increase at this local portion. As electrons are successively emitted from the electron emission array, those electrons emitted toward the vicinity of the portion of the photoelectric conversion film that is illuminated by highly bright light have their trajectory bent towards this portion of the photoelectric conversion film having an extremely high potential. This phenomenon will hereinafter be referred to as "bending". As a result of the bending, holes accumulated in this portion of the photoelectric conversion film will be read out. Consequently, the output video image suffers an artifact by which a highly bright object appears expanded from its original size (which will hereinafter be referred to as "blooming"), degrading image quality such as image resolution.

Further, when highly bright light enters a portion of the photoelectric conversion film, a large amount of holes are generated and accumulated in this portion. When this happens, it may not be possible to read out all the generated and accumulated holes by use of the electrons emitted from the electron emission array on a single scan, thereby creating a prominent capacitive residual image.

Moreover, the entry of highly bright light into the photoelectric conversion film causes a large amount of holes to be accumulated on the electron scan side of the photoelectric conversion film. This serves to drop the effective electric field applied to the photoelectric conversion film, resulting in a large amount of optically generated electric charge (electrons and holes) being trapped in the photoelectric conversion film. As the electric field in the photoelectric conversion film increases in response to scanning on the photoelectric conversion film by electrons successively emitted from the electron emission array, the optically generated electric charge is released from its trapped state. Holes of this freed electric charge are then accumulated on the electron scan side of the photoelectric conversion film. As a result, these holes that were trapped are read out on a next scan, creating a prominent photoconductive residual image.

In order to obviate these problems, research has been conducted with respect to a flat-type imaging device that continues to apply voltage to a gate electrode during a residual charge sweeping period that follows immediately after an image signal output period, during which a pixel signal for a horizontal scan line is read (see Patent Document 2, for example). The application of voltage serves to remove residual electric charge to prevent residual images from occurring in response to the entry of highly bright light.

The flat-type imaging device disclosed in Patent Document 2 also applies a voltage to the gate electrode of a next horizontal scan line in an excessively-accumulated charge sweeping period following the residual charge sweeping period, and sets the potential of cathode electrodes higher than the potential of a reference scan surface. This serves to remove the accumulated electric charge that is provided in excess of the amount readable within a video signal output period. With this arrangement, white saturation, smear, and resolution degradation resulting from imaging a highly bright object are prevented.

Patent Document 2 discloses dividing a no-video-signal-output period following a video signal output period into two periods including a residual charge sweeping period and an excessively-accumulated charge sweeping period. In the residual charge sweeping period, all the electron sources included in a horizontal scan line for which a video signal has just been output emit electrons to remove residual holes existing in the photoelectric conversion film at the position opposite to this horizontal scan line. The disclosed flat-type imaging device can thus prevent the occurrence of residual images responsive to highly bright incident light.

According to Patent Document 2, further, in the excessively-accumulated charge sweeping period, all the electron sources included in a horizontal scan line for which a video signal is about to be output emit electrons to remove excessive holes accumulated in the photoelectric conversion film at the position opposite to this horizontal scan line. The disclosed flat-type imaging device can thus prevent white saturation, smear, and the degradation of image resolution from occurring in response to highly bright incident light.

In Patent Document 2, however, electrons are emitted without exception during a no-video-signal-output period, i.e., during a blanking period, regardless of whether highly bright light enters the photoelectric conversion film. Because of this, electrons emitted during the blanking period are wasted if no highly bright light enters the photoelectric conversion film.

By the same token, electrons emitted during the blanking period toward a portion of the photoelectric conversion film where no highly bright light arrives are wasted even if highly bright light enters another portion of the photoelectric conversion film.

Such drive method ends up not only wasting all or part of emitted electrons but also imposing a heavy load on the electron emission array. This gives rise to a problem in that the reliability and product life of the electron emission array will be significantly degraded.

In Patent Document 2, further, electron sources included in a horizontal scan line for which a video signal has just been read and in a horizontal scan line for which a video signal is about to be read are made to emit electrons in a single blanking period during one field or frame period. When extremely bright light enters the photoelectric conversion film to accumulate a large amount of holes on the electron-scan side of the photoelectric conversion film, the amount of electrons emitted in a single blanking period fails to remove all the residual holes remaining in the photoelectric conversion film immediately following a corresponding scan and all the excessive holes accumulated in the photoelectric conversion film immediately prior to scan. There is thus a risk of suffering the occurrence of capacitive residual images and the degradation of image resolution due to blooming.

Further, the imaging device disclosed in Patent Document 2 cannot prevent the generation of a photoconductive residual image resulting from the lowering of an electric field within the photoelectric conversion film in response to highly bright incident light. Especially when a highly bright object in motion is filmed, the object leaves a visible trace on the screen. This causes a severe reduction in image quality.

Accordingly, there is a need for an imaging apparatus that can prevent the degradation of image resolution and the generation of capacitive or photoconductive residual images resulting from the entry of highly bright light into the photoelectric conversion film while reducing the load on the electron emission array.

[Patent Document 1] Japanese Patent Application Publication No. 6-176704.

[Patent Document 2] Japanese Patent Application Publication No. 2004-134144.

SUMMARY OF THE INVENTION

It is a general object of the present invention to provide an imaging apparatus that substantially obviates one or more problems caused by the limitations and disadvantages of the related art.

An imaging apparatus of at least one embodiment includes an electron emission array having electron sources arranged in matrix form and having a plurality of horizontal scan lines, a photoelectric conversion film opposed to the electron emission array, and a control and drive circuit configured to select one or more of the horizontal scan lines in a given video signal output period and to cause the electron sources included in the selected one or more horizontal scan lines to emit electrons toward the photoelectric conversion film to produce a video signal, wherein the control and drive circuit is configured to control electron emission of the electron emission array in a blanking period in response to a signal level of the video signal produced in the given video signal output period.

Further, the control and drive circuit may be configured to select, in response to the signal level of the video signal produced in the given video signal output period, one or more of the electron sources that emit electrons in the blanking period.

Alternatively, the control and drive circuit may be configured to select, in response to the signal level of the video signal produced in the given video signal output period, one or more of the horizontal scan lines including electron sources that emit electrons in the blanking period.

Moreover, the control and drive circuit may be configured to control a duration of the electron emission of the electron emission array in the blanking period in response to the signal level of the video signal produced in the given video signal output period.

Yet further, the control and drive circuit may be configured to control, in response to the signal level of the video signal produced in the given video signal output period, a number of blanking periods in which the electron emission array emits electrons between the given video signal output period and a next video signal output period in which the selected one or more horizontal scan lines will be selected next time.

Moreover, the electron emission array may include a first electrode for emitting electrons and a second electrode for creating a potential gap with the first electrode, and a potential gap may be created between the first electrode and the second electrode to draw out electrons from the first electrode in the given video signal output period and in the blanking period.

In such a case, at least one of the first electrode and the second electrode may receive a first voltage in the blanking period, and may receive a second voltage different from the first voltage in the given video signal output period.

Further, the potential gap created between the first electrode and the second electrode in the blanking period may be controlled in response to the signal level of the video signal produced in the given video signal output period.

Moreover, the photoelectric conversion film may receive a first voltage in the blanking period, and may receive a second voltage different from the first voltage in the given video signal output period.

According to at least one embodiment, an imaging apparatus can prevent the degradation of image resolution and the generation of capacitive or photoconductive residual images resulting from the entry of highly bright light into the photoelectric conversion film while reducing the load on the electron emission array.

BRIEF DESCRIPTION OF THE DRAWINGS

Other objects and further features of the present invention will be apparent from the following detailed description when read in conjunction with the accompanying drawings, in which:

FIGS. 2A and 2B are drawings showing the configuration of an imaging device included in the imaging apparatus of the first embodiment, wherein FIG. 2A is a partial-cross-sectional perspective view showing the schematic configuration of the imaging device, and FIG. 2B is a cross-sectional view showing a portion of the imaging device in an enlarged view;

FIG. 5 is a drawing showing the amplitude and timing of pulse voltages applied to the gate electrodes LV of the electron emission array in the imaging apparatus of the first embodiment;

FIG. 7 is a drawing showing the amplitude and timing of other pulse voltages applied to the gate electrodes LV of the imaging apparatus of the first embodiment;

FIG. 8 is a drawing showing the amplitude and timing of other pulse voltages applied to the gate electrodes LV of the imaging apparatus of the first embodiment;

FIG. 9 is a drawing showing the amplitude and timing of other pulse voltages applied to the cathode electrodes LH of the imaging apparatus of the first embodiment;

FIGS. 20A and 20B are drawings showing the amplitude of an output video signal obtained by reading holes accumulated in a photoelectric conversion film at the position opposite to unit areas by use of electrons emitted from the cathodes of these unit areas corresponding to two horizontal scan lines between which video signal output timings are different in the imaging apparatus of the second embodiment;

FIG. 21 is a drawing showing the amplitude and timing of pulse voltages applied to the vertical scan control lines Lv of the electron emission array in the imaging apparatus of the second embodiment;

FIG. 27 is a drawing showing the amplitude and timing of other pulse voltages applied to the horizontal scan control lines Lh of the imaging apparatus of the second embodiment;

FIG. 28 is a drawing showing the amplitude and timing of other pulse voltages applied to the horizontal scan control lines Lh of the imaging apparatus of the second embodiment;

FIG. 29 is a drawing showing the amplitude and timing of other pulse voltages applied to the vertical scan control lines Lv of the imaging apparatus of the second embodiment;

FIG. 30 is a drawing showing the amplitude and timing of other pulse voltages applied to the horizontal scan control lines Lh of the imaging apparatus of the second embodiment;

FIG. 31 is a drawing showing the amplitude and timing of other pulse voltages applied to the horizontal scan control lines Lh of the imaging apparatus of the second embodiment; and FIG. 32 is a drawing showing the amplitude and timing of other pulse voltages applied to the vertical scan control lines Lv of the imaging apparatus of the second embodiment.

DESCRIPTION OF THE PREFERRED EMBODIMENTS

In the following, embodiments to which an imaging apparatus of the present invention is applied will be described.

First Embodiment

Figure 1:
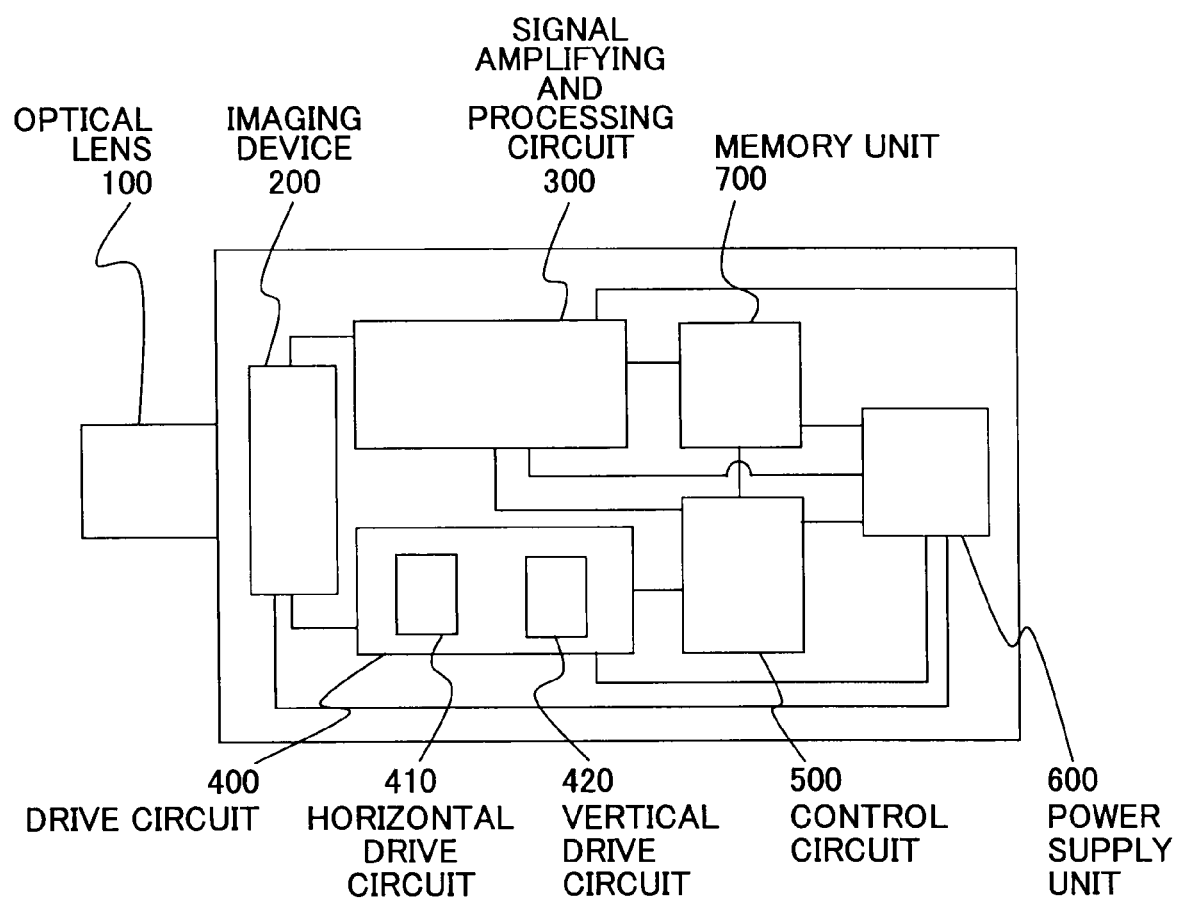
FIG. 1 is a schematic cross-sectional view of an imaging apparatus according to a first embodiment.

FIG. 1 is a schematic cross-sectional view of an imaging apparatus according to a first embodiment. The imaging apparatus of this embodiment includes an optical lens 100, an imaging device 200, a signal amplifying and processing circuit 300, a drive circuit 400, a control circuit 500, a power supply unit 600, and a memory unit 700.

The optical lens 100 and the imaging device 200 are arranged such that light passing through the optical lens 100 enters the photoelectric conversion film of the imaging device 200 perpendicularly to form a focus thereon.

The signal amplifying and processing circuit 300 amplifies and processes video signals output from the imaging device 200.

The memory unit 700 serves to record and store video signals output from the signal amplifying and processing circuit 300. The memory unit 700 may be implemented by use of a known volatile or nonvolatile memory.

The control circuit 500 generates a clock signal, synchronizing signals, and the like, and supplies these signals to the drive circuit 400 and the signal amplifying and processing circuit 300. The control circuit 500 also reads a video signal that is recorded and stored in the memory unit 700, and generates electron-emission-array control signals based on the signal level (e.g., amplitude) of this video signal for provision to the drive circuit 400.

The drive circuit 400 includes a horizontal drive circuit 410, a vertical drive circuit 420, etc., and generates pulse voltages necessary to drive the imaging device 200 based on the clock signal, synchronizing signals, electron-emission-array control signals, and the like supplied from the control circuit 500.

The power supply unit 600 supplies power to the imaging device 200, the signal amplifying and processing circuit 300, the drive circuit 400, the control circuit 500, and the memory unit 700.

If the drive circuit 400 is embedded in the electron emission array 250, the drive circuit 400 shown in FIG. 1 is not used. In this case, the control circuit 500 directly supplies a clock signal, synchronizing signals, and the electron-emission-array control signals to the imaging device 200. Further, the electric power necessary to drive the imaging device 200 is directly supplied from the power supply unit 600 to the imaging device 200.

The configuration shown in FIG. 1 is directed to an example in which the memory unit 700 is used to record and store video signals. Alternatively, a known video delay circuit may be used in place of the memory unit 700.

Figure 2B:
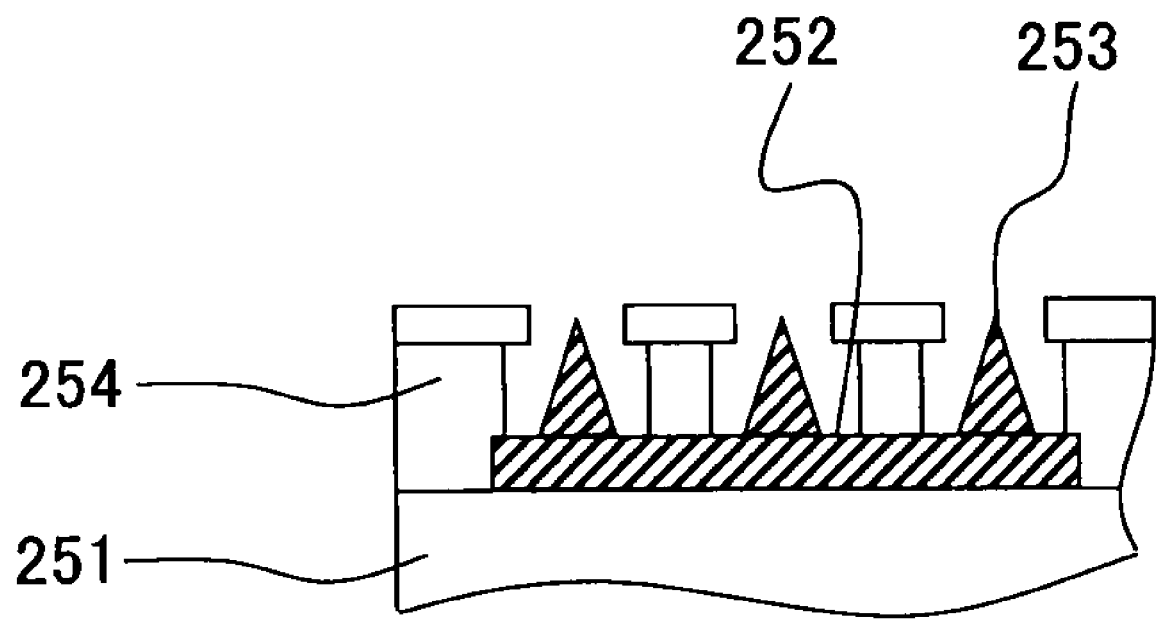

FIGS. 2A and 2B are drawings showing the configuration of the imaging device 200 included in the imaging apparatus of the first embodiment. FIG. 2A is a partial-cross-sectional perspective view showing the schematic configuration of the imaging device 200. FIG. 2B is a cross-sectional view showing a portion of the imaging device 200 in an enlarged view. The imaging device 200 of this embodiment includes a translucent substrate 210, a translucent conductive film 220, a photoelectric conversion film 230, a mesh electrode 240, and a Spindt-type emitter array 250.

The translucent conductive film 220 is formed on the translucent substrate 210. The photoelectric conversion film 230 is formed on the translucent conductive film 220. The Spindt-type emitter array 250 is disposed to face the photoelectric conversion film 230 across vacuum space. The mesh electrode 240 having a plurality of openings is disposed between the photoelectric conversion film 230 and the electron emission array 250.

Although omitted in FIG. 2A for the sake of simplicity of illustration, the imaging device 200 for use in practice includes a mechanism for supporting the electron emission array 250, the photoelectric conversion film 230, and the mesh electrode 240 at predetermined intervals in an opposing manner. The imaging device 200 further includes electrodes for supplying a DC voltage and pulse voltages necessary to drive the imaging device 200. The imaging device 200 moreover includes a vacuum chamber for keeping vacuum space between the electron emission array 250 and the photoelectric conversion film 230.

The imaging device 200 may not be provided with the function to converge electrons emitted from the electron emission array 250 on the photoelectric conversion film 230. In such case, a magnetic field converging system inclusive of a permanent magnet or a solenoid coil may be provided outside the imaging device 200.

The translucent substrate 210 may be made of glass if the imaging device 200 is designed to detect visible light. The translucent substrate 210 maybe made of sapphire or silica glass if the imaging device 200 is designed to detect ultraviolet light. The translucent substrate 210 may be made of beryllium (Be), silicon (Si), aluminum (Al), titanium (Ti), boron nitride (BN), aluminum oxide ($Al_2O_3$), or the like if the translucent substrate 210 is designed to detect X rays. In this manner, proper material may be selected depending on the wavelength of light to be detected.

The translucent conductive film 220 may be configured as a tin oxide ($SnO_2$) film, an ITO film, or a thin metal film such as an aluminum (Al) film, for example. The translucent conductive film 220 is connected to an external circuit 610, which includes a power supply 611 to apply voltage. The external circuit 610 is implemented as part of the signal amplifying and processing circuit 300 and the power supply unit 600 shown in FIG. 1.

A material for forming the photoelectric conversion film 203 may be a semiconductor material such as selenium (Se), silicon (Si), or the like, or may be a compound semiconductor material such as lead oxide (PbO), antimony trisulfide (Sb2S3), cadmium selenide (CdSe), cadmium telluride (CdTe), gallium arsenide (GaAs), zinc telluride (ZnTe), or the like.

Among these materials, a semiconductor material such as selenium (Se) or silicon (Si) may be used to form an amorphous semiconductor film. Application of high voltage to such film causes avalanche amplification of optically generated electric charge in the film, thereby significantly improving sensitivity.

It suffices for the mesh electrode 240 to have a plurality of openings. The mesh electrode 240 may be made of a known metal material, alloy material, semiconductor material, or the like. The mesh electrode 240 is connected to a power supply 620. The mesh electrode 240 receives a voltage higher than the voltage applied to the gate electrodes of the electron emission array 250, which will later be described. The power supply 620 is implemented as part of the power supply unit 600 shown in FIG. 1.

The electron emission array 250 is implemented as a matrix array of known electron emission sources such as Spindt-type emitters having cathodes made of a high-melting-point metal, silicon-type emitters having cathodes made of silicon (Si), or electron field emission sources having porous silicon, silicon oxide, or the like placed between electrodes.

Further, there are a variety of methods for driving an electron emission array. The electron emission array 250 may be a passive electron emission array driven by pulse voltages supplied from an external drive circuit, a drive-circuit-embedded passive electron emission array having a drive circuit embedded therein, an active electron emission array having a transistor embedded in each unit area of the array, or a drive-circuit-embedded active electron emission array having a drive circuit embedded therein and also having a transistor embedded in each unit area of the array.

The present embodiment will be described with respect to a case in which a Spindt-type passive emitter array is used as the electron emission array 250. In the following, the term "electron emission array 250" is intended to refer to a Spindt-type passive emitter array 250 unless contrary indication is provided.

As shown in FIG. 2A, the electron emission array 250 of the present embodiment includes a substrate 251, cathode electrodes 252, cathodes 253, an insulation layer 254, and gate electrodes 255.

The substrate 251 is made of glass, silicon (Si), quartz, ceramics, resin, or the like. The cathode electrodes 252, the insulation layer 254, and the gate electrodes 255 are disposed on the substrate 251 in the order listed.

The cathode electrodes 252 are stripe-shape electrodes having a longitudinal direction thereof extending parallel to the vertical scan direction shown in FIG. 2A. The gate electrodes 255 are stripe-shape electrodes having a longitudinal direction thereof extending parallel to the horizontal scan direction shown in FIG. 2A. In this manner, the cathode electrodes 252 and the gate electrodes 255 extend perpendicularly to each other to form an X-Y matrix.

An intersecting area defined by a cathode electrode 252 and a gate electrode 255 intersecting with each other is referred to as "unit area", which will be referred to by reference number "256". The unit area 256 corresponds to a pixel of the photoelectric conversion film 230. A plurality of unit areas 256 included in the stripe-shape area of a given gate electrode 255 are arranged in the horizontal scan direction to form a line that is referred to as a horizontal scan line 257.

In each unit area 256, small holes extend through the gate electrode 255 and the insulation layer 254 to reach the surface of the cathode electrode 252 as shown in FIG. 2B. The cathodes 253 are disposed in these holes to project from the cathode electrodes 252.

The cathodes 253 are made of a high-melting-point metal material such as molybdenum (Mo), niobium (Nb), tungsten (W), or the like. In typical configuration, a plurality of small holes are provided in each unit area 256, and each hole has a single cathode 253 provided therein. FIG. 2A shows a configuration in which 9 small holes are formed in each unit area 256 so that 9 cathodes 253 are provided.

These 9 cathodes 253 constitute a minimum unit of electron emission control provided in each unit area 256, and are referred to as an "element".

The cathode electrodes 252 receive pulse voltages from the horizontal drive circuit 410 to perform a scan in the horizontal direction. The gate electrodes 255 receive pulse voltages from the vertical drive circuit 420 to perform a scan in the vertical direction. This will later be described in detail by referring to FIG. 3.

Although not illustrated in FIGS. 2A and 2B, each unit area 256 may be provided with a convergence electrode on the gate electrode 255 via an insulator to surround the cathodes 253, thereby converging electrons emitted from the cathodes 253 on the photoelectric conversion film 230.

In such imaging device 200, light arriving from above the translucent substrate 210 passes through the translucent substrate 210 and the translucent conductive film 220 to reach the photoelectric conversion film 230. This transmitted light causes electron and hole pairs to be generated in the photoelectric conversion film 230.

When a voltage higher than the voltage applied to the cathodes 253 is applied to the translucent conductive film 220 by the power supply 611 of the external circuit 610, the holes in the photoelectric conversion film 230 move in the photoelectric conversion film 230 toward the electron emission array 250 (i.e., move in the thickness direction of the photoelectric conversion film 230 toward the electron emission array 250) to be accumulated in the photoelectric conversion film 230 on the side closer to the electron emission array 250.

The electron emission array 250 receives pulse voltages from the drive circuit 400, such that the cathodes 253 included in the unit areas 256, i.e., elements, emit electrons. The electrons serve to read holes accumulated in the photoelectric conversion film 230 at the position opposite to these unit areas.

Figure 3:
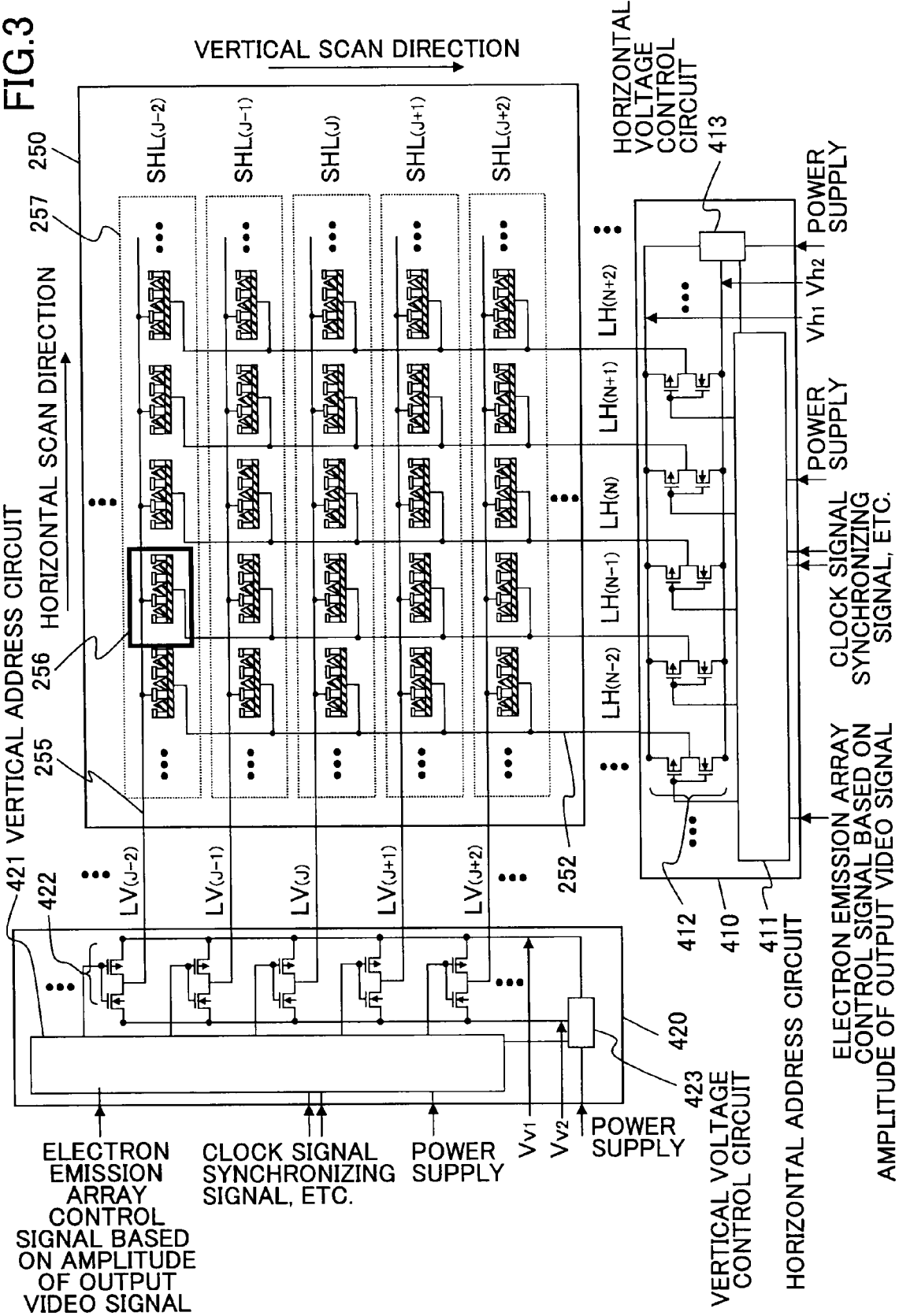
FIG. 3 is a schematic plan view of a drive system of an electron emission array included in the imaging apparatus according to the first embodiment.

FIG. 3 is a schematic plan view of a drive system of the electron emission array 250 included in the imaging apparatus according to the first embodiment.

In the following, the cathode electrodes 252 may sometimes be referred to as cathode electrodes LH for the sake of convenience of explanation which will later be given with respect to pulse voltages applied to the electron emission array 250. The cathode electrodes LH are arranged in the horizontal scan direction. In FIG. 3, cathode electrodes LH(N−2) through LH(N+2) are shown instead of showing all the cathode electrodes LH. N is any integer number.

By the same token, the gate electrodes 255 may sometimes be referred to as gate electrodes LV. The gate electrodes LV are arranged in the vertical scan direction of the imaging device 200. In FIG. 3, gate electrodes LV(J−2) through LV(J+2) are shown instead of showing all the gate electrodes LV. J is any integer number.

By the same token, the horizontal scan line 257 may sometimes be referred to as a horizontal scan line SHL. Horizontal scan lines SHL are provided as many as there are gate electrodes LV in the vertical scan direction. In FIG. 3, horizontal scan lines SHL(J−2) through SHL(J+2) are shown instead of showing all the horizontal scan lines SHL. J is any integer number.

As shown in FIG. 3, the electron emission array 250 is connected to the horizontal drive circuit 410 and the vertical drive circuit 420 for performing scans in the horizontal direction and in the vertical direction.

The horizontal drive circuit 410 includes a horizontal address circuit 411, horizontal buffer circuits 412, and a horizontal voltage control circuit 413.

The horizontal address circuit 411 receives electric power from the power supply unit 600 shown in FIG. 1. The horizontal address circuit 411 also receives a clock signal, synchronizing signals, and electron-emission-array control signals supplied from the control circuit 500 to select and drive one of the horizontal buffer circuits 412 provided for the respective cathode electrodes LH.

The horizontal buffer circuit 412 includes a pair of transistors driven by the horizontal address circuit 411. The horizontal buffer circuit 412 supplies pulse voltages to a cathode electrode LH selected by the horizontal address circuit 411.

The horizontal voltage control circuit 413 is controlled by the horizontal address circuit 411. The horizontal voltage control circuit 413 controls the pulse voltages supplied to the cathode electrodes LH via the horizontal buffer circuits 412.

In such horizontal drive circuit 410, the pulse voltages generated and output from the horizontal address circuit 411 drive and control the horizontal buffer circuits 412. Through the driving of the horizontal buffer circuit 412, the pulse voltages (amplitude: Vh1−Vh2) comprised of voltages Vh1 and Vh2 (Vh1>Vh2) supplied from the horizontal voltage control circuit 413 are supplied to the cathode electrodes LH. In this manner, a scan in the horizontal direction is performed by applying pulse voltages from the horizontal drive circuit 410 to the cathode electrodes LH.

The vertical drive circuit 420 includes a vertical address circuit 421, vertical buffer circuits 422, and a vertical voltage control circuit 423. The vertical drive circuit 420 has the same configuration as the horizontal drive circuit 410, except that the vertical drive circuit 420 is connected to the gate electrodes LV of the electron emission array 250 to supply pulse voltages to the gate electrodes LV. The function and operation of the vertical address circuit 421, the vertical buffer circuits 422, and the vertical voltage control circuit 423 are also the same as those of the horizontal address circuit 411, the horizontal buffer circuits 412, and the horizontal voltage control circuit 413, except that the gate electrodes LV are subjected to scan.

In such vertical drive circuit 420, the pulse voltages generated and output from the vertical address circuit 421 drive and control the vertical buffer circuits 422. Through the driving of the vertical buffer circuits 422, pulse voltages (amplitude: Vv1−Vv2) comprised of voltages Vv1 and Vv2 (Vv1>Vv2) supplied from the vertical voltage control circuit 423 are supplied to the gate electrodes LV. In this manner, a scan in the vertical direction is performed by applying pulse voltages from the vertical drive circuit 420 to the gate electrodes LV.

In the electron emission array 250, an element situated at the intersection between a gate electrode 255 and a cathode electrode 252 emit electrons when voltage Vv1 is applied to this gate electrode 255 and voltage Vh2 is applied to this cathode electrode 252.

In a video signal output period, pulse voltages generated by the vertical drive circuit 420 based on the clock signal and synchronizing signals supplied from the control circuit 500 are supplied to the gate electrodes 255, and pulse voltages generated by the horizontal drive circuit 410 are supplied to the cathode electrodes 252. Electrons successively emitted from the elements are used to read holes accumulated in the opposite photoelectric conversion film 230.

In a blanking period, pulse voltages generated by the vertical drive circuit 420 in response to the electron-emission-array control signals based on the amplitude of an output signal as supplied from the control circuit 500 are supplied to the gate electrodes 255, and pulse voltages generated by the horizontal drive circuit 410 are supplied to the cathode electrodes 252. With this arrangement, the cathodes 253 of the unit areas 256 opposite to the portion of the photoelectric conversion film 230 that is illuminated by highly bright light are made to emit electrons to remove excessive holes accumulated in this portion of the photoelectric conversion film 230.

The configuration shown in FIG. 3 is directed to a case in which the cathode electrodes 252 (LH) are controlled to perform a scan in the horizontal direction for producing a video signal, and the gate electrodes 255 (LV) are controlled to perform a scan in the vertical direction. Alternatively, provision may be made such that a scan in the vertical direction is performed by use of the cathode electrodes 252 (LH), and a scan in the horizontal direction is performed by use of the gate electrodes 255 (LV).

Figure 4A:
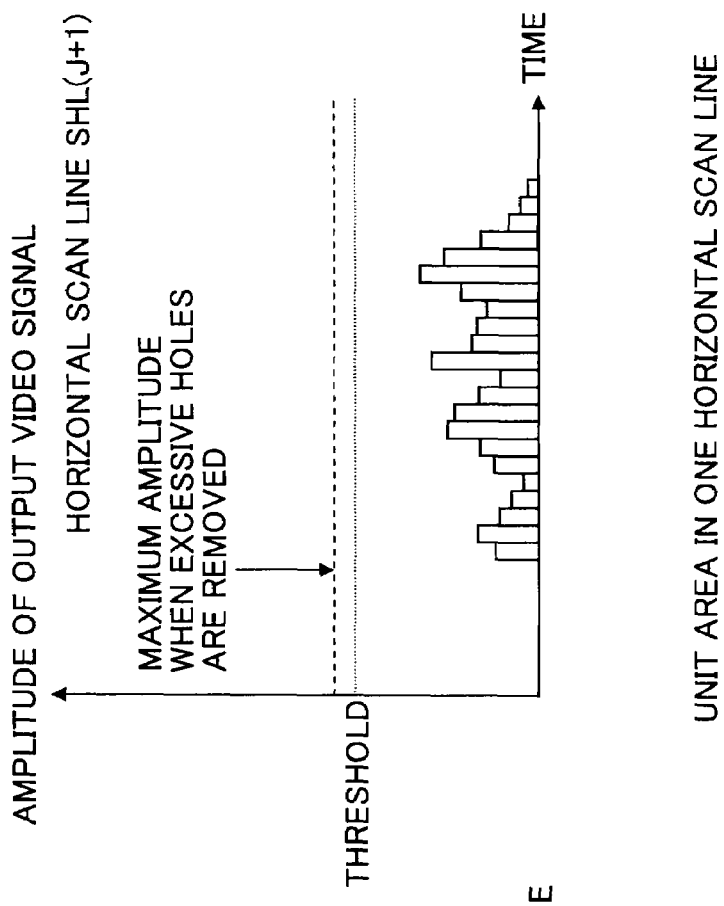
FIGS. 4A and 4B are drawings showing the amplitude of an output video signal obtained by reading holes accumulated in a photoelectric conversion film at the position opposite to unit areas by use of electrons emitted from the cathodes of these unit areas corresponding to two horizontal scan lines between which video signal output timings are different in the imaging apparatus of the first embodiment.
Figure 4B:
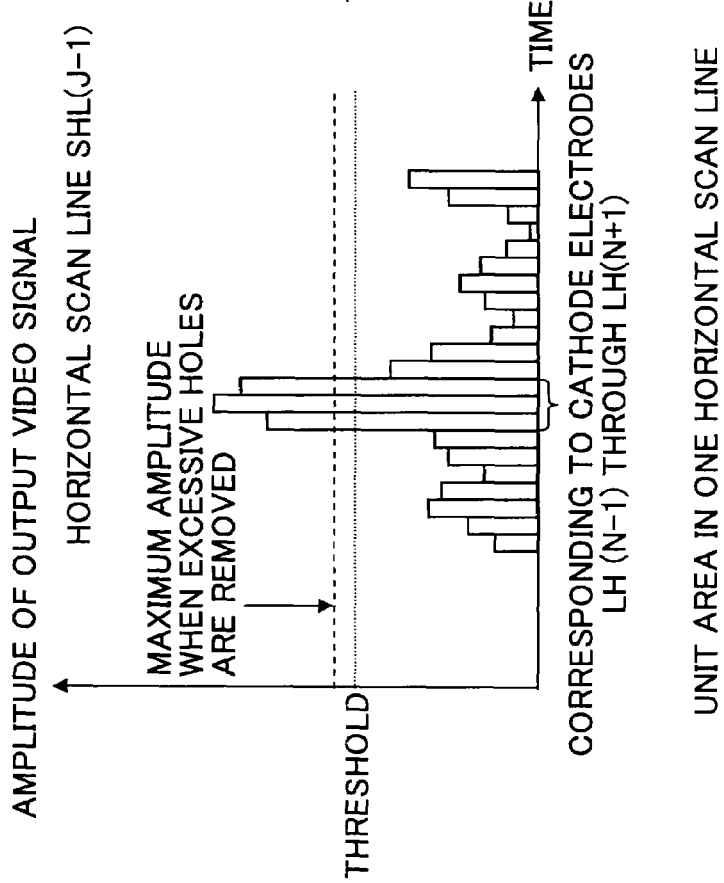

FIGS. 4A and 4B are drawings showing the amplitude of an output video signal obtained by reading holes accumulated in the photoelectric conversion film 230 at the position opposite to unit areas 256 by use of electrons emitted from the cathodes 253 of these unit areas 256 corresponding to two horizontal scan lines SHL(J−1) and SHL(J+1) between which video signal output timings are different.

In FIGS. 4A and 4B, the larger the amplitude of an output video signal, the higher the intensity of light (i.e., magnitude of light) incident to the corresponding portion of the photoelectric conversion film 230 is.

In order to check whether there is highly bright incident light, a threshold value is provided for comparison with the amplitude of an output video signal. The threshold value is selected such that the selected threshold value is smaller than the maximum amplitude of the output video signal readable by electrons emitted from the cathodes 253 of each unit area 256 during a video signal output period.

When the cathodes 253 of a unit area 256 included in the horizontal scan line 257 (i.e., an element included in the horizontal scan line 257) emit electrons, the amplitude of the output video signal read by these electrons may exceed the above-noted threshold value. When this happens, the element for which the signal amplitude has exceeded the threshold emits electrons in a horizontal blanking period.

When the amplitude of the output video signal does not exceed the threshold, electrons are not emitted in the horizontal blanking period.

Such threshold-based control is performed to efficiently remove excessive holes accumulated in the photoelectric conversion film 230 only at the position where highly bright light enters. This serves to prevent the creation of residual images and the degradation of image resolution while reducing the load on the electron emission array 250.

FIG. 5 is a drawing showing the amplitude and timing of pulse voltages applied to the gate electrodes 255 of the electron emission array 250 in order to perform the above-described control in the imaging apparatus having the drive system shown in FIG. 3.

Figure 6:
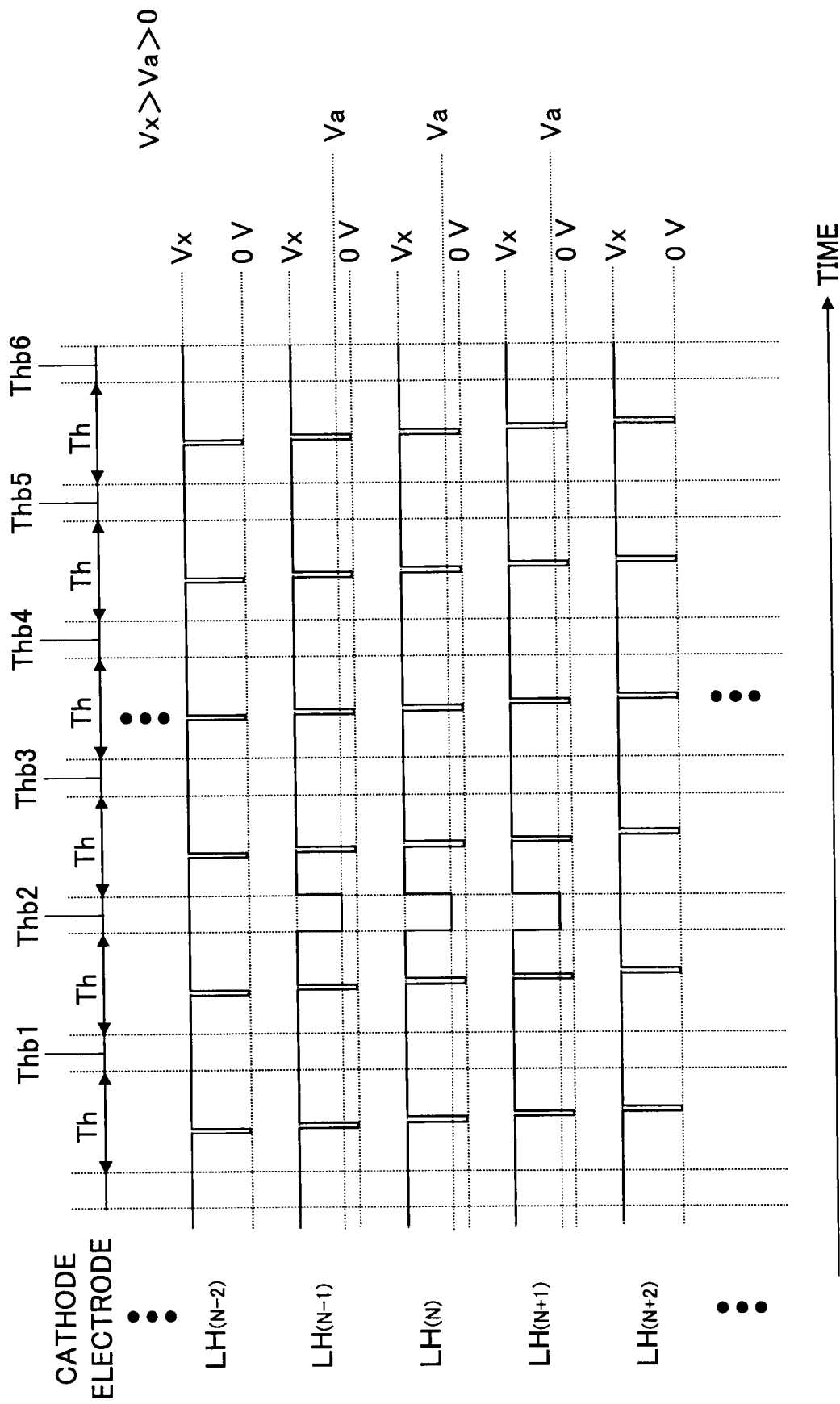
FIG. 6 is a drawing showing the amplitude and timing of pulse voltages applied to the cathode electrodes LH of the electron emission array in the imaging apparatus of the first embodiment.

FIG. 6 is a drawing showing the amplitude and timing of pulse voltages applied to the cathode electrodes 252 of the electron emission array 250 in order to perform the above-described control in the imaging apparatus having the drive system shown in FIG. 3.

In FIG. 5, pulse voltages Vv1 and Vv2 supplied from the vertical voltage control circuit 423 to the gate electrodes LV of the electron emission array 250 are selected such that Vv1 is Vx (Vx>0 V), and Vv2 is the ground potential (0 V).

In FIG. 6, the voltages Vh1 and Vh2 of the pulse voltages supplied from the horizontal voltage control circuit 413 to the cathode electrodes LH of the electron emission array 250 are selected such that Vh1 is Vx or Va (Vx>Va>0 V), and Vh2 is the ground potential (0 V), or such that Vh1 is Vx, and Vh2 is Va or the ground potential.

In FIG. 5 and FIG. 6, Th represents a video signal output period in a horizontal scan, and Thb represents a horizontal blanking period.

The pulse voltages as shown in FIG. 5 and FIG. 6 are applied to the cathode electrodes 252 and the gate electrodes 255. In the video signal output period Th on a horizontal scan, an element situated at the intersection between a gate electrode 255 and a cathode electrode 252 emit electrons when voltage Vx is applied to this gate electrode 255 and voltage 0 V is applied to this cathode electrode 252.

The emitted electrons are drawn out towards the photoelectric conversion film 230 as shown in FIG. 2 by the mesh electrode 240 set at high voltage that is higher than the voltage Vx applied to the gate electrodes 255. Electrons arriving at the photoelectric conversion film 230 and holes accumulated in the photoelectric conversion film 230 are coupled with each other, so that an electric current flows through the external circuit 610 via the translucent conductive film 220. This electric current is detected as an output signal, which is amplified and processed by the signal amplifying and processing circuit 300 to produce a video signal responsive to an incident light image.

When all the holes accumulated in the photoelectric conversion film 230 are read by use of electrons emitted from the electron emission array 250, the potential of the photoelectric conversion film 230 on the side closer to the electron emission array 250 is reset to the potential (0 V) of the cathodes 253 that is used at the time of electron emission in the video signal output period Th on a horizontal scan.

Upon subsequent entry of light into the photoelectric conversion film 230, holes generated by the light are accumulated in the photoelectric conversion film 230 on the side closer to the electron emission array 250, resulting in an increase of potential at the corresponding position.

In the horizontal blanking period Thb, an element situated at the intersection between a gate electrode 255 and a cathode electrode 252 emit electrons when voltage Vx is applied to this gate electrode 255 and voltage Va is applied to this cathode electrode 252.

As shown in FIG. 5, the voltage Vx is applied to the gate electrode LV(J−1) corresponding to the horizontal scan line SHL(J−1), for which the amplitude of an output video signal has exceeded the threshold, in a horizontal blanking period Thb2 immediately preceding the period during which a video signal is output from the horizontal scan line SHL(J−1). On the other hand, voltage 0 V is applied in each horizontal blanking period Thb to the gate electrode LV(J+1) corresponding to the horizontal scan line SHL(J+1) for which the amplitude of an output video signal has not exceeded the threshold.

As shown in FIG. 6, the voltage Va is applied in the horizontal blanking period Thb2 to the cathode electrodes LH(N−1) through LH(N+1) corresponding to the unit areas 256 for which the amplitude of an output video signal has exceeded the threshold. On the other hand, the voltage Vx is applied in each horizontal blanking period Thb to the cathode electrodes corresponding to the unit areas 256 for which the amplitude of an output video signal has not exceeded the threshold.

The pulse voltages as described above are applied to the gate electrodes LV and the cathode electrodes LH to emit electrons in the horizontal blanking period Thb2 from the cathodes 253 of a unit area 256 situated at each of the intersections between the gate electrode LV(J−1) and the cathode electrodes LH(N−1) through LH(N+1). That is, electrons are emitted from the cathodes 253 of the unit areas 256 for which the amplitude of an output video signal has exceeded the threshold.

When a large amount of holes are generated and accumulated in the photoelectric conversion film 230 in response to highly bright light, the potential of the photoelectric conversion film 230 at the corresponding position may exceed Va. In such a case, electrons emitted from the cathodes 253 having the voltage Va remove holes accumulated at this position until the potential at this position drops to Va. With this arrangement, thus, it is possible to selectively remove only the excessive holes accumulated in the photoelectric conversion film 230 at the position corresponding to the position of highly bright incident light.

In the above-described drive method, Va or the threshold value is selected such that the maximum amplitude of an output video signal exceeds the threshold value when excessive holes accumulated in the photoelectric conversion film 230 are to be removed.

The configuration shown in FIG. 6 has been directed to an example in which the voltage Va is applied to the cathode electrodes LH in the horizontal blanking period Thb2 to remove only excessive holes generated and accumulated in the photoelectric conversion film 230. Alternatively, voltage 0 V may be applied to the cathode electrodes LH in the horizontal blanking period Thb2, and the power supply 611 shown in FIG. 2A is controlled such that a voltage lower than the voltage applied to the photoelectric conversion film 230 during the video signal output period Th is applied to the photoelectric conversion film 230 in the horizontal blanking period Thb2. Such drive method can as well remove only excessive holes accumulated in the photoelectric conversion film 230.

In this drive method, Vx is applied to the gate electrode 255 and Va is applied to the cathode electrodes 252 for the entire duration of the horizontal blanking period Thb2. Alternatively, Vx and Va may be applied to the gate electrode 255 and the cathode electrodes 252, respectively, for only a partial period of the horizontal blanking period Thb2.

In the above-described drive method, the voltage Vx applied to the gate electrode LV(J−1) in the horizontal blanking period Thb2 is identical to the voltage Vx applied to the gate electrodes LV in each video signal output period. Alternatively, a voltage different from the voltage Vx may be applied to the gate electrode 255 in the horizontal blanking period Thb2. Especially when a voltage higher than the voltage Vx is applied to the gate electrode LV(J−1) in the horizontal blanking period Thb2 as shown in FIG. 7, an increased amount of electrons can be emitted from the elements for which the amplitude of an output video signal exceeds the threshold.

In the above-described drive method, further, the voltage Vx is applied to the gate electrode LV(J−1) corresponding to the horizontal scan line SHL(J−1), for which the amplitude of an output video signal has exceeded the threshold, only once in the horizontal blanking period Thb2 between the outputting of the video signal and the outputting of a next video signal. Alternatively, as shown in FIG. 8, provision may be made such that the voltage Vx is applied to the gate electrode LV(J−1) in a plurality of horizontal blanking periods Thb.

FIG. 9 is a drawing showing the amplitude and timing of pulse voltages applied to the cathode electrodes LH when the voltage pulses shown in FIG. 8 are applied to the gate electrode LV(J−1).

With the application of pulse voltages as shown in FIG. 8 and FIG. 9, electrons are emitted from each element belonging to the horizontal scan line SHL(J−1), for which the amplitude of an output video signal has exceeded the threshold, in a plurality of horizontal blanking periods Thb between the outputting of the video signal and the outputting of a next video signal.

With this arrangement, only excessive holes accumulated in the photoelectric conversion film 230 are selectively removed in the plurality of horizontal blanking periods during one field or frame period even when highly bright light enters the photoelectric conversion film 230. This serves to prevent the creation of capacitive residual images and the degradation of image resolution due to blooming while reducing the load on the electron emission array 250.

As described above, excessive holes accumulated in the photoelectric conversion film 230 are removed in the plurality of horizontal blanking periods during one field or frame period. Accordingly, the lowering of an in-film electric field due to the entry of highly bright light into the photoelectric conversion film 230 is avoided, thereby preventing the occurrence of photoconductive residual images.

Figure 10B:
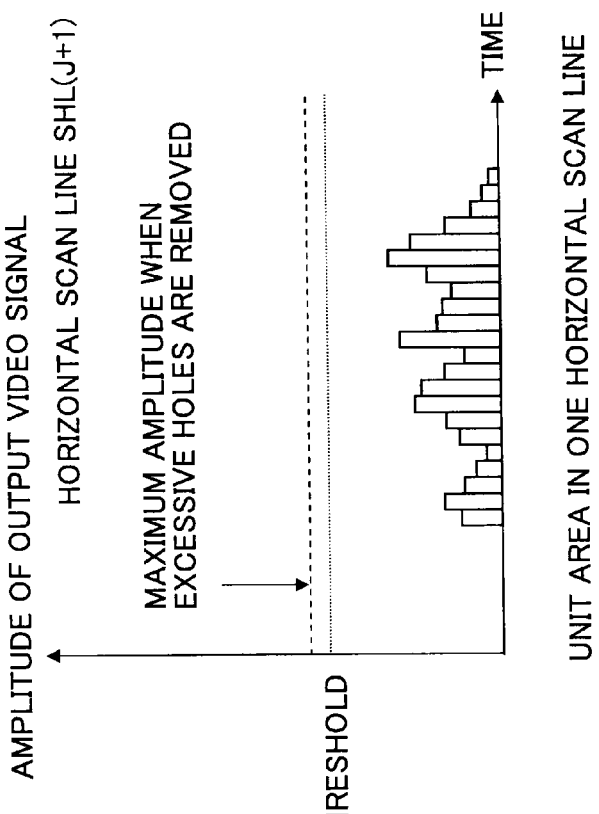
FIGS. 10A and 10B are drawings showing the amplitude of an output video signal as appears after the removal of excessive holes accumulated in the photoelectric conversion film using the amplitude of an output video signal shown in FIGS. 4A and 4B.
Figure 10A:
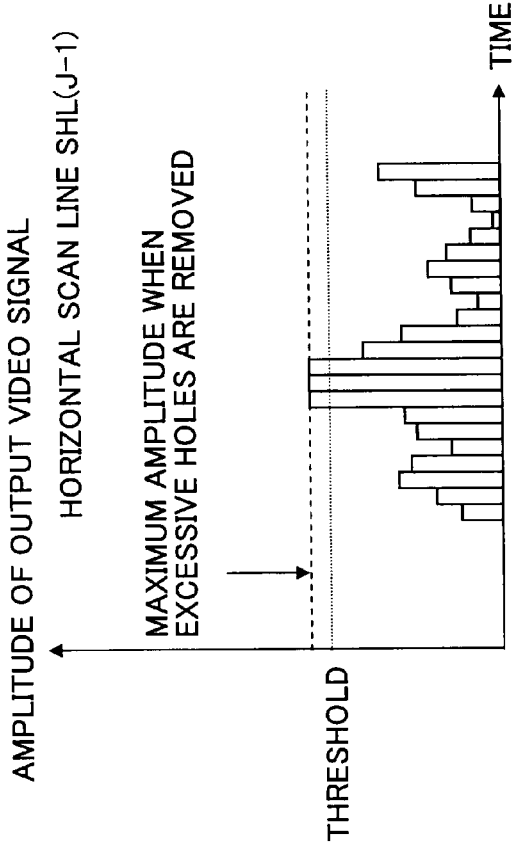

FIGS. 10A and 10B are drawings showing the amplitude of an output video signal as appears after the removal of excessive holes accumulated in the photoelectric conversion film 230 by use of the drive method of the first embodiment using the amplitude of an output video signal shown in FIGS. 4A and 4B.

Excessive holes are removed from the photoelectric conversion film 230 at the position opposite to the unit areas 256 for which the amplitude of an output video signal exceeds the threshold value. The amplitudes of the output video signals obtained from such unit areas 230 are lowered to a level determined by the voltage Va applied to the cathodes 253 as shown in FIG. 10A.

However, the amplitude responsive to the voltage Va applied to the cathodes 253 is higher than the threshold. Electrons thus continue to be emitted in the horizontal blanking period Thb. Such emission of electrons in the horizontal blanking period Thb continues until the amplitude of the output video signal is lowered below the threshold value in response to a decrease in the amount of incident light.

It should be noted that, in the above-described operation, electrons emitted in the horizontal blanking period Thb in response to an output video signal are used to remove excess holes accumulated in the photoelectric conversion film 230.

There is thus a delay in control. When a highly bright luminous object in motion is filmed, for example, there is a risk of suffering the occurrence of residual images and the degradation of image resolution.

There is thus a need to prevent the occurrence of residual images and the degradation of image resolution attributable to a delay in the output-video-signal-based control of electron emission in the horizontal blanking period Thb. To this end, electrons are emitted in the horizontal blanking period Thb also from the elements for which the amplitude of an output video signal has not exceeded the threshold. Further, the duration of electron emission in the horizontal blanking period Thb is controlled in response to the amplitude of an output video signal with respect to the elements for which the amplitude of an output video signal has exceeded the threshold and the elements for which the amplitude of an output video signal has not exceeded the threshold.

Figure 11:
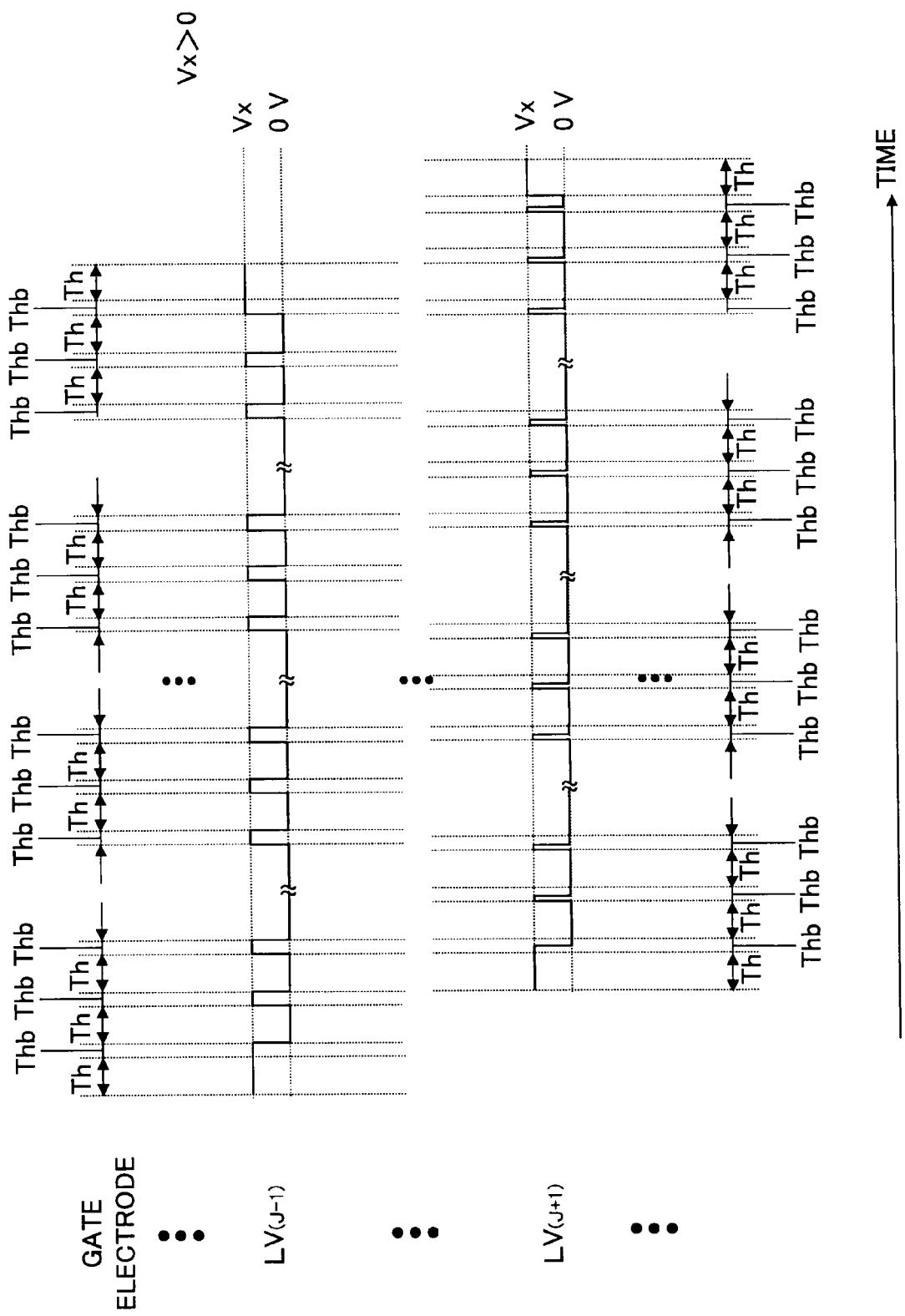
FIG. 11 is a drawing showing the amplitude and timing of other pulse voltages applied to the gate electrodes LV of the imaging apparatus of the first embodiment.
Figure 12:
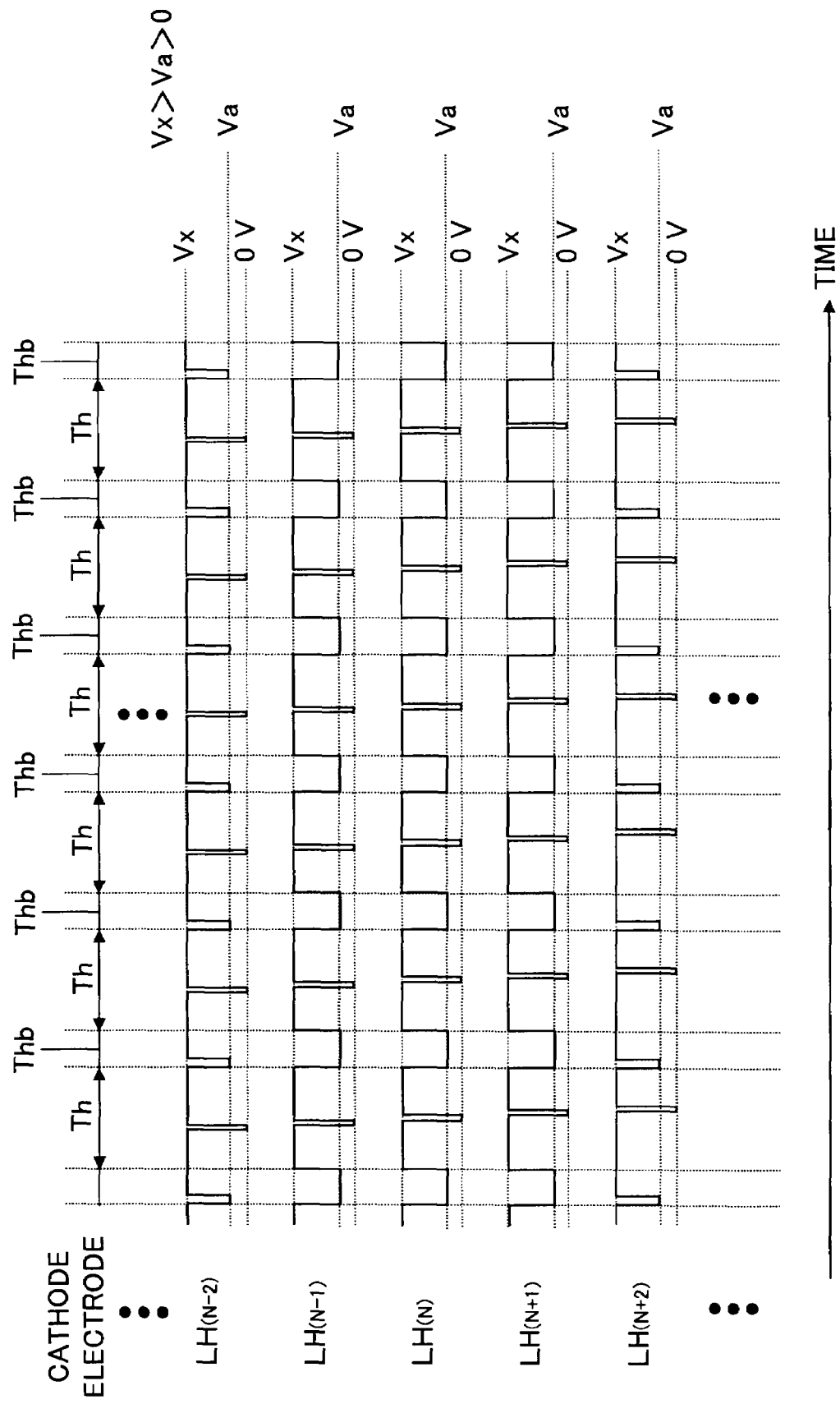
FIG. 12 is a drawing showing the amplitude and timing of other pulse voltages applied to the cathode electrodes LH of the imaging apparatus of the first embodiment.

FIG. 11 is a drawing showing the amplitude and timing of pulse voltages applied to the gate electrodes LV in order to achieve the above-described driving method. FIG. 12 is a drawing showing the amplitude and timing of pulse voltages applied to the cathode electrodes LH in order to achieve the above-described driving method.

With the application of these voltage pulses to the gate electrodes LV and the cathode electrodes LH, electrons are emitted in the horizontal blanking period Thb from the elements for which the amplitude of an output video signal has exceeded the threshold and from the elements for which the amplitude of an output video signal has not exceeded the threshold. Further, the elements for which the amplitude of an output video signal has exceeded the threshold emit electrons for a longer duration in each horizontal blanking period Thb than do the elements for which the amplitude of an output video signal has not exceeded the threshold.

This serves to prevent the occurrence of residual images and the degradation of image resolution attributable to a delay in the output-video-signal-based control of electron emission in the horizontal blanking period Thb when there is highly bright incident light.

Figure 13:
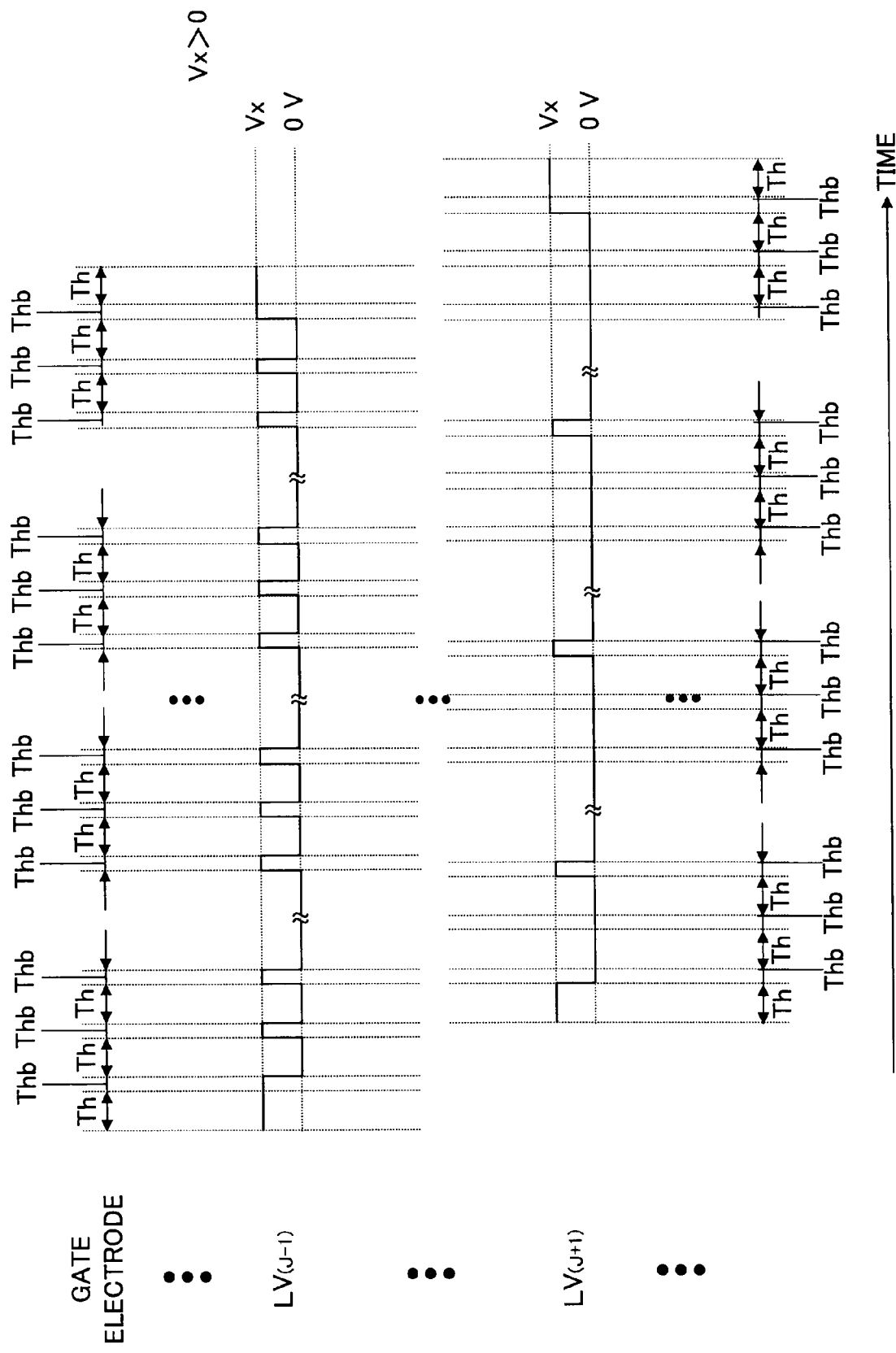
FIG. 13 is a drawing showing the amplitude and timing of other pulse voltages applied to the gate electrodes LV of the imaging apparatus of the first embodiment.
Figure 14:
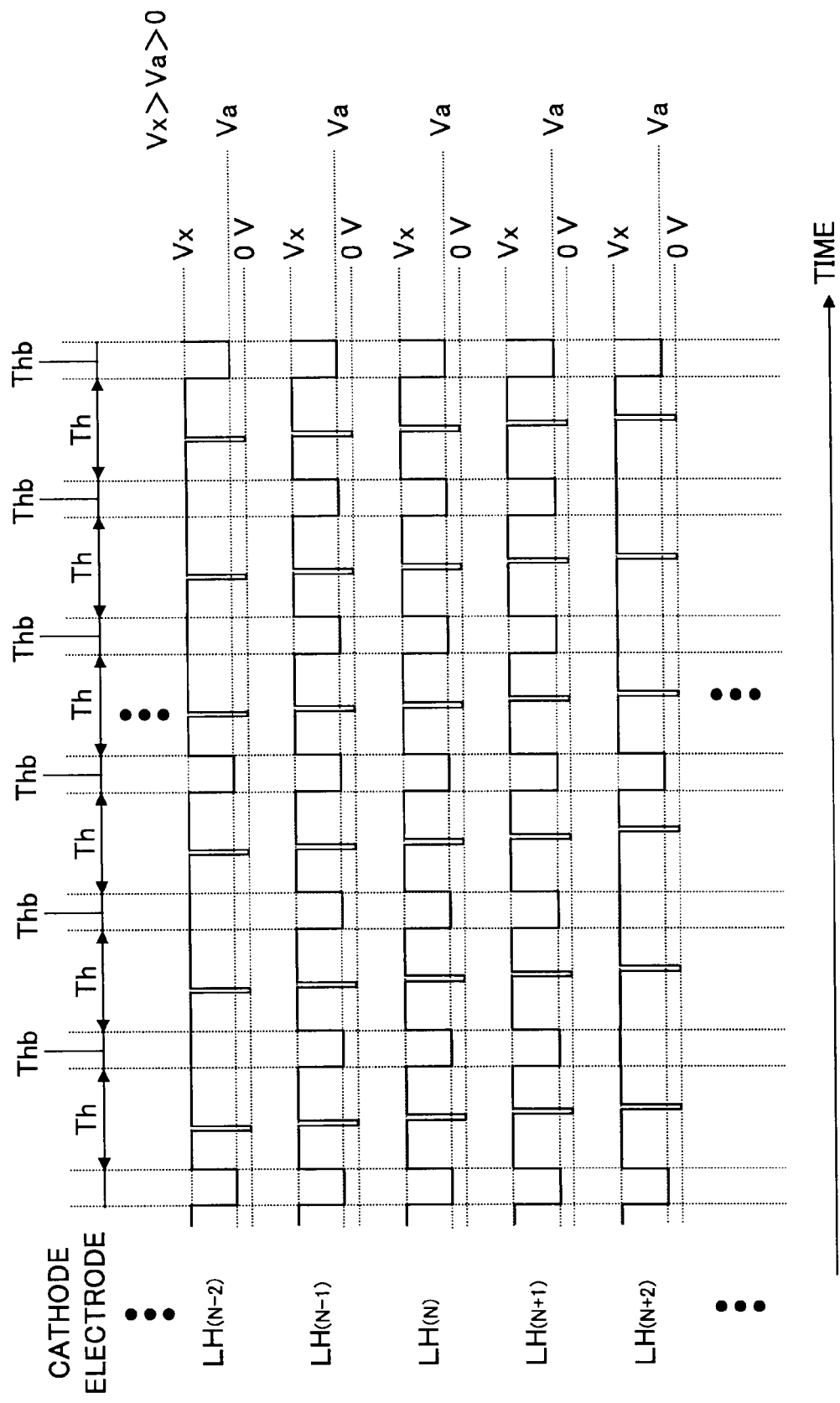
FIG. 14 is a drawing showing the amplitude and timing of other pulse voltages applied to the cathode electrodes LH of the imaging apparatus of the first embodiment.

The operation performed through the application of voltage pulses shown in FIG. 11 and FIG. 12 has been directed to an example in which the duration of electron emission in the horizontal blanking period Thb is adjusted in response to the amplitude of an output video signal. Alternatively, as shown in FIG. 13 and FIG. 14, the number of horizontal blanking periods Thb in which the voltage Vx is applied to the gate electrode LV and the voltage Va is applied to the cathode electrode LH may be increased with respect to each element for which the amplitude of an output video signal has exceeded the threshold. With respect to the elements for which the amplitude of an output video signal has not exceeded the threshold, on the other hand, the number of horizontal blanking periods Thb in which the voltage Vx is applied to the corresponding gate electrode LV and the voltage Va is applied to the corresponding cathode electrode LH may be decreased. With this arrangement, the duration or time length of electron emission in the horizontal blanking periods Thb of one field or frame period is made to vary between the elements for which the amplitude of an output video signal has exceeded the threshold and the elements for which the amplitude of an output video signal has not exceeded the threshold. This provides substantially the same advantages as in the case of application of voltage pulses shown in FIG. 11 and FIG. 12.

Figure 15:
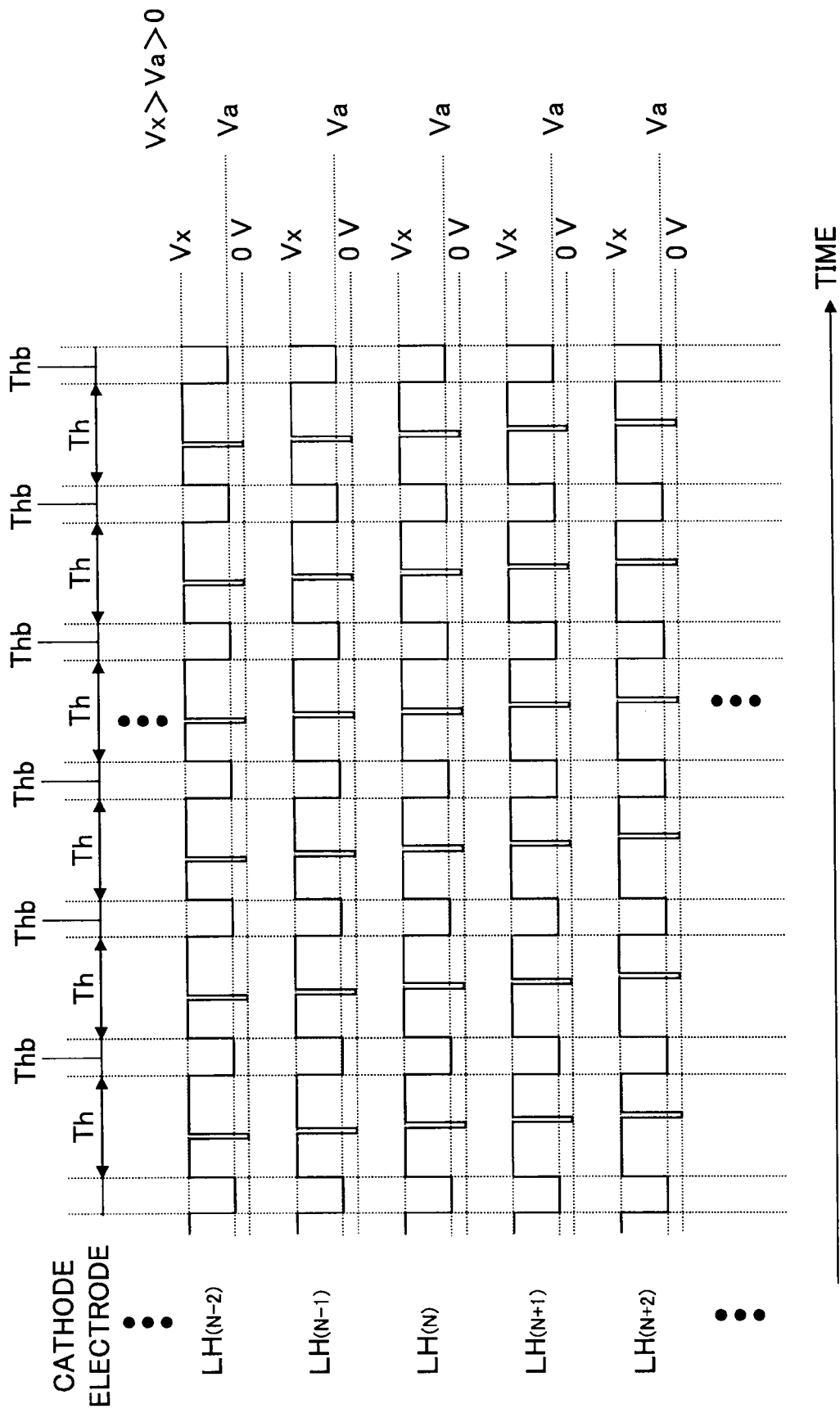
FIG. 15 is a drawing showing the amplitude and timing of other pulse voltages applied to the cathode electrodes LH of the imaging apparatus of the first embodiment.

The above-described embodiment has been directed to a configuration in which electrons are emitted in the horizontal blanking period Thb from the elements for which the amplitude of an output video signal has exceeded the threshold, thereby removing excessive holes from the photoelectric conversion film 230 at the opposite position. In place of the voltage pulses applied to the cathode electrodes LH as shown in FIG. 6 or FIG. 9, pulse voltages shown in FIG. 15 may be applied to the cathode electrodes LH to cause electrons to be emitted in the horizontal blanking period Thb from all the elements belonging to the horizontal scan line 257 for which the amplitude of an output video signal has exceeded the threshold.

This serves to perform the control of electron emission on a horizontal-scan-line-specific basis in the horizontal blanking period Thb according to the amplitude of an output video signal.

Second Embodiment

Figure 16:
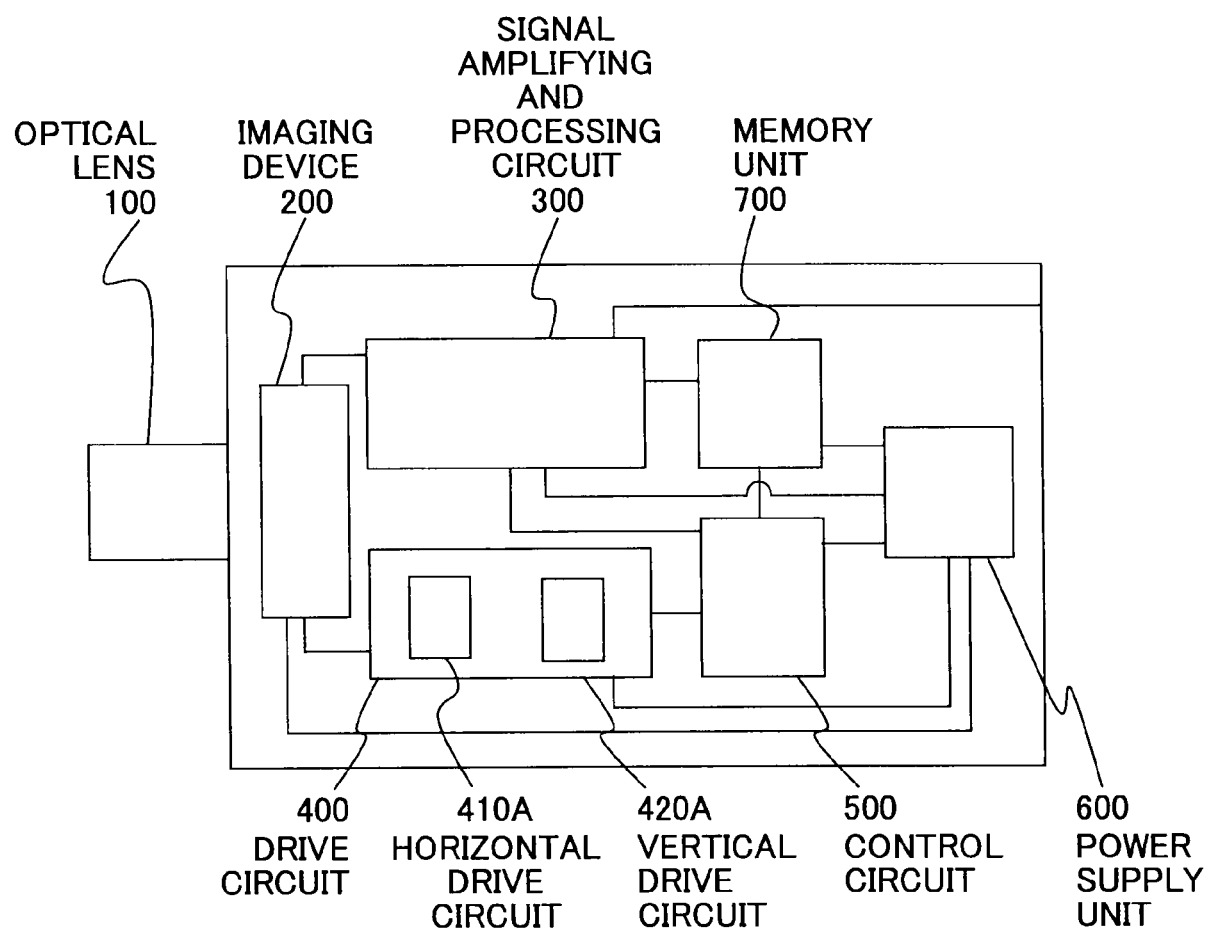
FIG. 16 is a schematic cross-sectional view of an imaging apparatus according to a second embodiment.

FIG. 16 is a schematic cross-sectional view of an imaging apparatus according to a second embodiment. The imaging apparatus of the present embodiment differs from the imaging apparatus of the first embodiment in the configuration of the imaging device 200 and the configurations of a horizontal drive circuit 410A and a vertical drive circuit 420A included in the drive circuit 400. In the following, a description will be given mainly with respect to such differences. The same elements as those of the imaging apparatus of the first embodiment are referred to by the same numerals, and a description thereof will be omitted.

Figure 17:
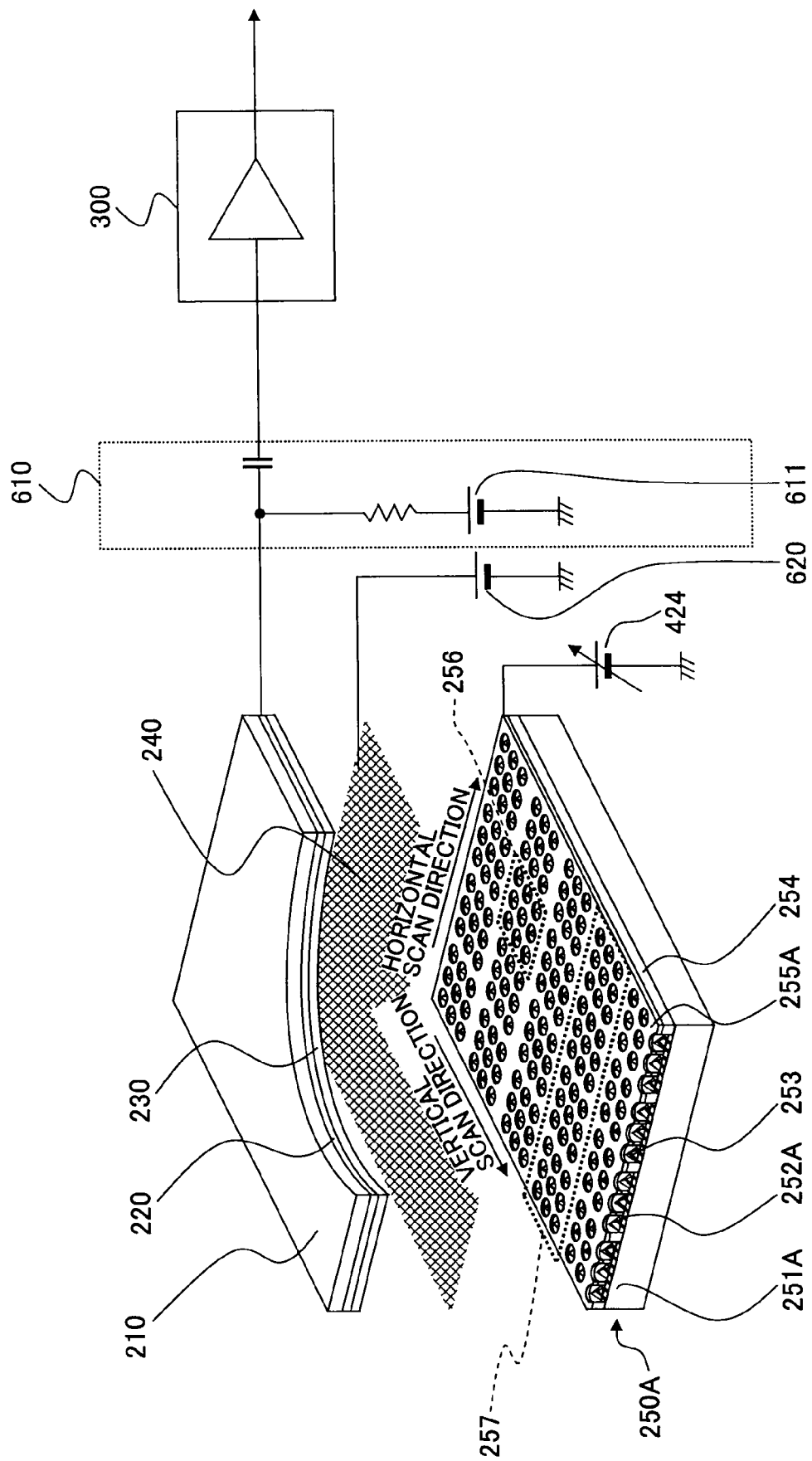
FIG. 17 is a partial-cross-sectional perspective view showing the configuration of an imaging device included in the imaging apparatus according to the second embodiment.
Figure 18:
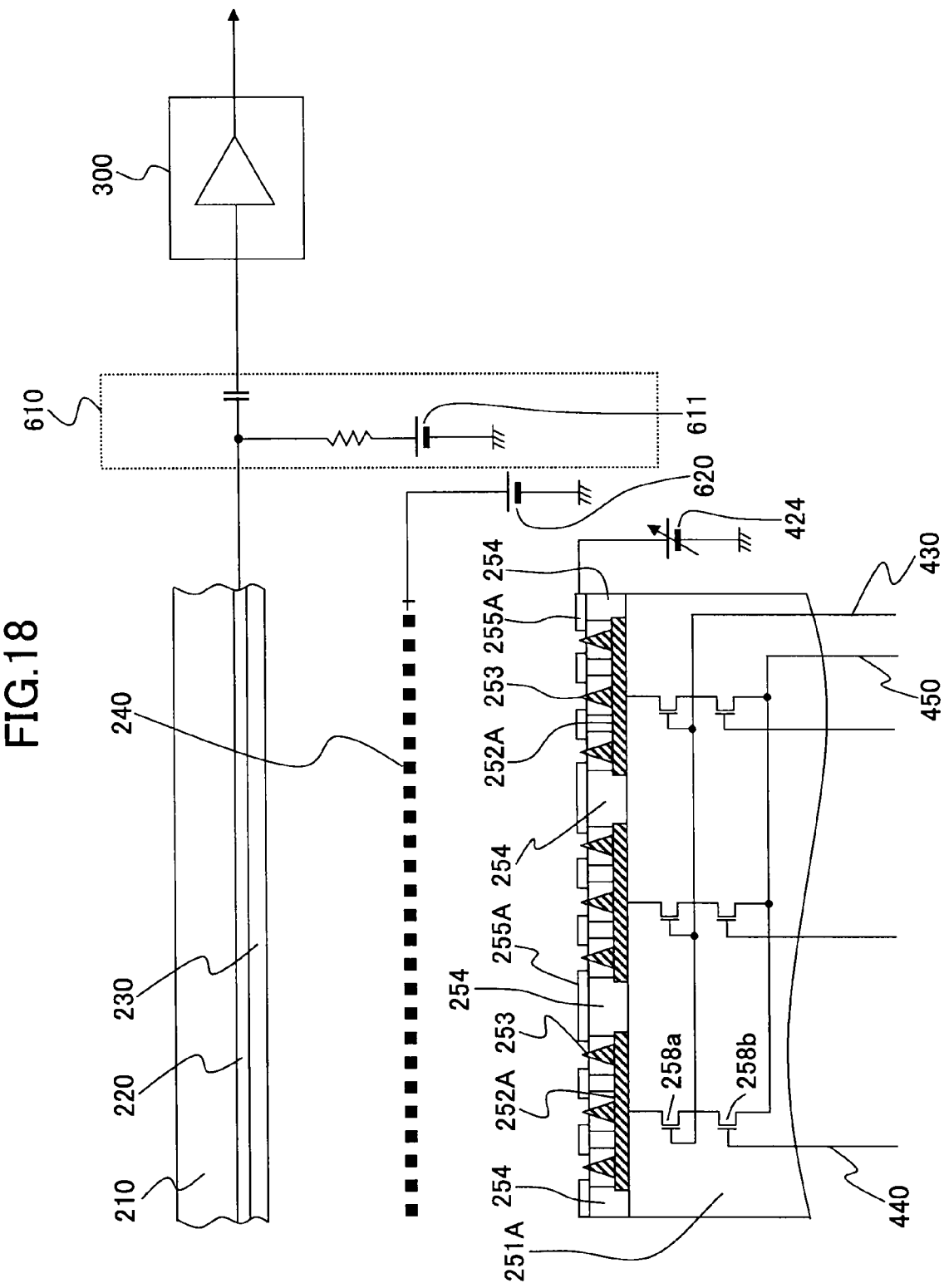
FIG. 18 is a schematic drawing showing the configuration of a main part of the imaging device included in the imaging apparatus according to the second embodiment.

FIG. 17 is a partial-cross-sectional perspective view showing the configuration of the imaging device 200 included in an imaging apparatus according to the second embodiment. FIG. 18 is a schematic drawing showing the configuration of a main part of the imaging device 200 included in the imaging apparatus according to the second embodiment.

The electron emission array of the imaging device 200 used in the present embodiment is a Spindt-type active electron emission array 250A, which is driven by pulse voltages and the like supplied from the drive circuit 400 externally provided, and which has transistors 258a and 258b embedded in the portion of a substrate 251A corresponding to each unit area 256. Its detail will later be described.

Further, there are a variety of methods for driving an electron emission array. The electron emission array 250A may be a passive electron emission array driven by pulse voltages supplied from an external drive circuit, a drive-circuit-embedded passive electron emission array having a drive circuit embedded therein, an active electron emission array having a transistor embedded in each unit area of the array, or a drive-circuit-embedded active electron emission array having a drive circuit embedded therein and also having a transistor embedded in each unit area of the array.

Further, there are a variety of electron emission arrays. The electron emission array 250 may be implemented as a matrix array of known electron emission sources such as Spindt-type emitters having cathodes made of a high-melting-point metal, silicon-type emitters having cathodes made of silicon (Si), or electron field emission sources having porous silicon, silicon oxide, or the like placed between electrodes.

The present embodiment will be described with respect to a case in which a Spindt-type active emitter array is used as the electron emission array 250A. The electron emission array 250A is basically the same as the electron emission array 250 of the first embodiment, except that the substrate 251A, unit-area-specific cathode electrodes 252, and gate electrode 255A have different configurations. In the following, the term "electron emission array 250A" is intended to refer to a Spindt-type active emitter array 250A unless contrary indication is provided.

The substrate 251A of the electron emission array 250A is made of a known semiconductor such as silicon (Si), gallium arsenide (GaAs), or the like, and includes an X-Y matrix array inclusive of transistors 258a and 258b corresponding to the respective unit areas 256.

The unit-area-specific cathode electrodes 252A formed on the substrate 251A are insulated from each other and spaced apart at predetermined intervals from adjacent unit-area-specific cathode electrodes. The unit-area-specific cathode electrodes 252A are electrically coupled to the transistors 258a.

In the present embodiment, an area defined by a unit-area-specific cathode electrode 252A is referred to as the unit area 256. In each unit area 256, small holes extend through the gate electrode 255A and the insulation layer 254 to reach the surface of the unit-area-specific cathode electrode 252A. The cathodes 253 are disposed in these holes to project from the unit-area-specific cathode electrode 252A. The electron emission sources constituting a minimum unit of electron emission control provided in each unit area 256 are referred to as an "element".

The gate electrode 255A is shared by all the unit areas 256.

Figure 19:
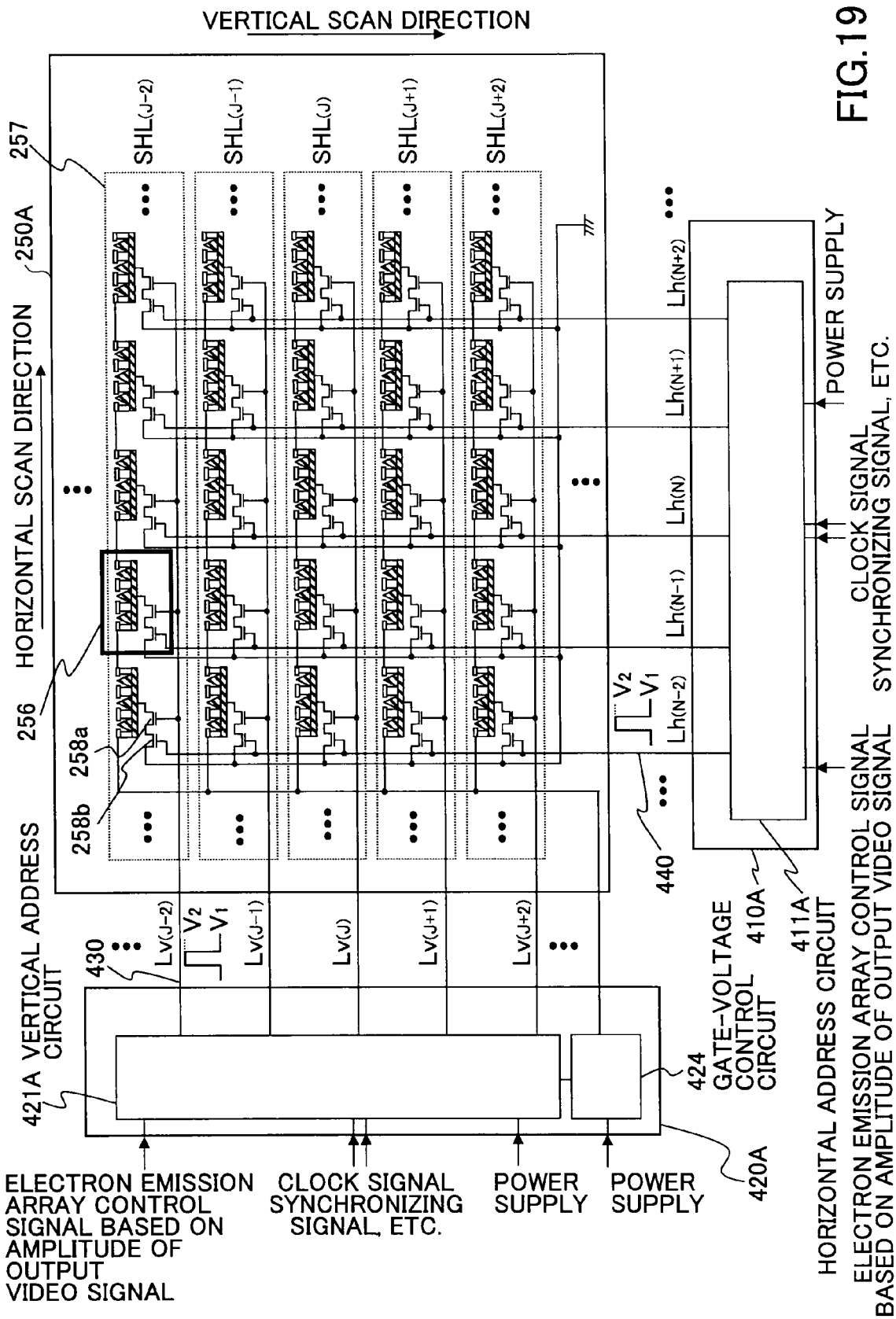
FIG. 19 is a schematic plan view of a drive system of the electron emission array included in the imaging apparatus according to the second embodiment.

FIG. 19 is a schematic plan view of a drive system of the electron emission array 250A included in the imaging apparatus according to the present embodiment.

In the following, a vertical scan control line 430 may sometimes be referred to as a vertical scan control line Lv for the sake of convenience of explanation which will later be given with respect to pulse voltages applied to the electron emission array 430A. The vertical scan control lines Lv are arranged in the vertical scan direction of the imaging device 200. In FIG. 19, vertical scan control lines Lv(J−2) through Lv(J+2) are shown instead of showing all the vertical scan control lines Lv. J is any integer number.

By the same token, a horizontal scan control line 440 may sometimes be referred to as a horizontal scan control line Lh. The horizontal scan control lines Lh are arranged in the horizontal scan direction. In FIG. 19, horizontal scan control lines Lh(N−2) through Lh(N+2) are shown instead of showing all the horizontal scan control lines Lh. N is any integer number.

By the same token, the horizontal scan line 257 may sometimes be referred to as a horizontal scan line SHL. Horizontal scan lines SHL are provided as many as there are vertical scan control lines Lv in the vertical scan direction. In FIG. 19, horizontal scan lines SHL(J−2) through SHL(J+2) are shown instead of showing all the horizontal scan lines SHL. J is any integer number.

A vertical-direction scan for the electron emission array 250A is performed by applying pulse voltages comprised of voltages V1 and V2 (V2>V1) to the vertical scan control lines Lv from the vertical address circuit 421A of the vertical drive circuit 420A to control the transistor 258a in each pixel 256. As the voltage V2 is applied to a vertical scan control line 430, the transistors 258a become conductive.

A horizontal-direction scan for the electron emission array 250A is performed by applying pulse voltages comprised of voltages V1 and V2 (V2>V1) to the horizontal scan control lines Lh from the horizontal address circuit 411A of the horizontal drive circuit 410A to control the transistor 258b in each unit area 258. As the voltage V2 is applied to a horizontal scan control line 440, the transistors 258b become conductive.

The transistor 258b of each unit area 256 is coupled to the ground potential (0 V). The gate electrode 255A receives the voltage Vx applied from a gate-voltage control circuit 424 of the vertical drive circuit 420.

When both of the transistors 258a and 258b are turned on in a unit area 256 of the electron emission array 250A, the unit-area-specific cathode electrode 252A and cathodes 253 of this unit area 256 receive 0 V. As a result, the cathodes 252 of this unit area 256 emit electrons in an amount corresponding to a potential difference between the voltage Vx applied to the gate electrode 255A and the voltage 0 V applied to the cathodes 253.

The vertical address circuit 421A of the vertical drive circuit 420A uses electron-emission-array control signals based on the amplitude of an output video signal as supplied from the control circuit 500, for example, to select a vertical scan control line 430 for application of the voltage V2 in the horizontal blanking period Thb.

The horizontal address circuit 411A of the horizontal drive circuit 410A uses the electron-emission-array control signals based on the amplitude of an output video signal as supplied from the control circuit 500, for example, to select a horizontal scan control line 440 to which the voltage V2 is applied in a horizontal blanking period Thb.

The configuration shown in FIG. 19 is directed to a case in which the transistors 258a are controlled to perform a scan in the vertical direction, and the transistors 258b are controlled to perform a scan in the horizontal direction. Alternatively, provision may be made such that a scan in the vertical direction is performed by controlling the transistors 258b, and a scan in the horizontal direction is performed by controlling the transistors 258a.

FIGS. 20A and 20B are drawings showing the amplitude of an output video signal obtained by reading holes accumulated in the photoelectric conversion film 230 at the position opposite to unit areas 256 by use of electrons emitted from the cathodes 253 of these unit areas 256 corresponding to two horizontal scan lines SHL(J−1) and SHL(J+1) between which video signal output timings are different.

In FIGS. 20A and 20B, the larger the amplitude of an output video signal, the higher the intensity of light (i.e., magnitude of light) incident to the corresponding portion of the photoelectric conversion film 230 is.

In order to check whether there is highly bright incident light, a threshold value is provided for comparison with the amplitude of an output video signal. The threshold value is selected such that the selected threshold value is smaller than the maximum amplitude of the output video signal readable by electrons emitted from the cathodes 253 of each unit area 256 (i.e., emitted from each element) during a video signal output period.

When the amplitude of an output video signal read by the electrons emitted from each element belonging to the horizontal scan line 257 exceeds the above-noted threshold value, the element for which the signal amplitude exceeds the threshold emits electrons in a horizontal blanking period.

When the amplitude of the output video signal does not exceed the threshold, electrons are not emitted in the horizontal blanking period.

Such threshold-based control makes it possible to selectively remove holes remaining in the photoelectric conversion film 230 after reading a large amount of holes accumulated in the photoelectric conversion film 230 illuminated by highly bright light.

That is, the occurrence of residual images is prevented upon entry of highly bright light into the photoelectric conversion film 230 while reducing the load on the electron emission array 250.

FIG. 21 is a drawing showing the amplitude and timing of pulse voltages applied to the vertical scan control lines Lv of the electron emission array 250A in order to perform the above-described control in the imaging apparatus having the drive system shown in FIG. 19.

Figure 22:
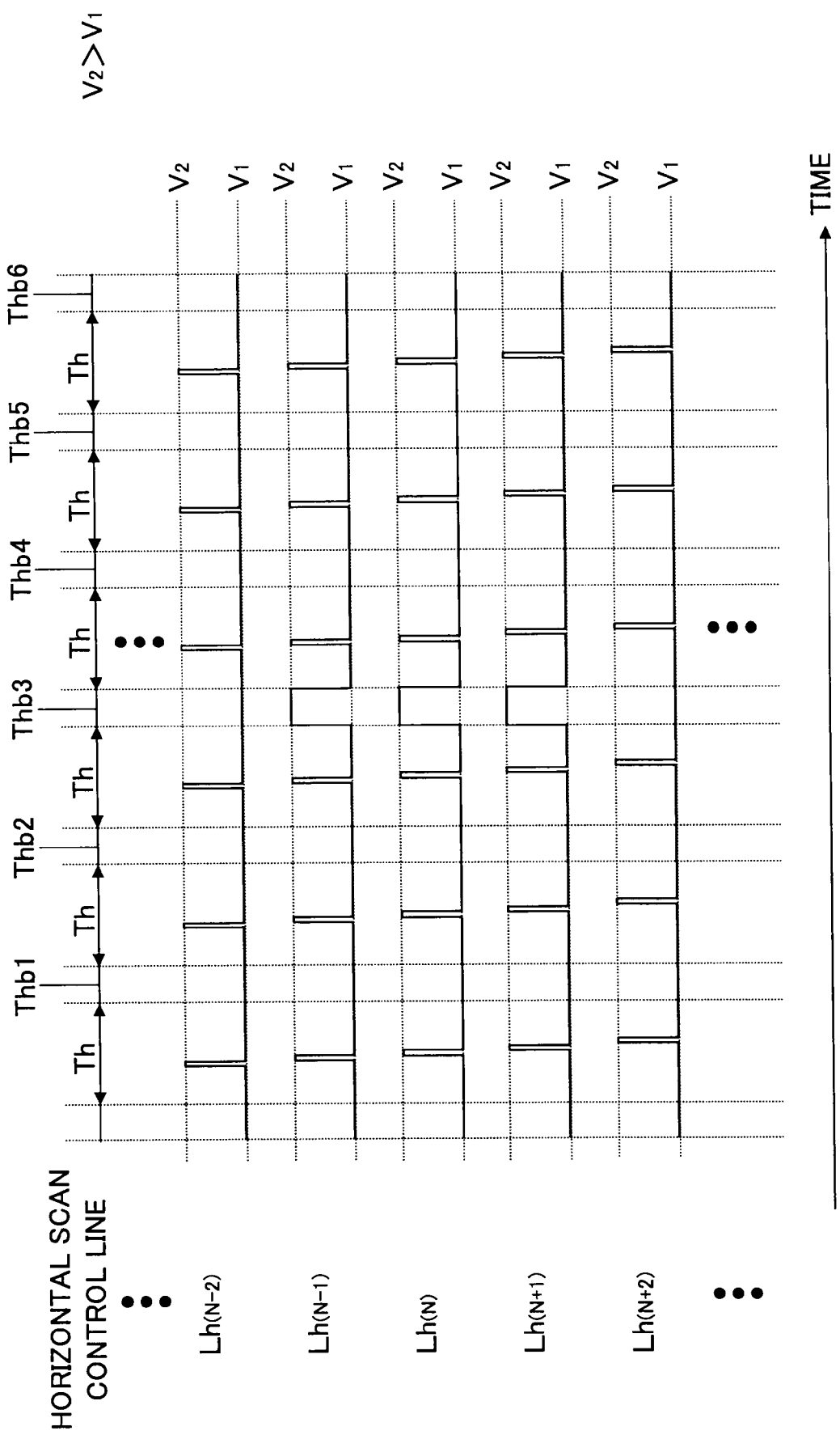
FIG. 22 is a drawing showing the amplitude and timing of pulse voltages applied to the horizontal scan control lines Lh of the electron emission array in the imaging apparatus of the second embodiment.

FIG. 22 is a drawing showing the amplitude and timing of pulse voltages applied to the horizontal scan control line Lh of the electron emission array 250A in order to perform the above-described control in the imaging apparatus having the drive system shown in FIG. 19.

With the application of pulse voltages as shown in FIG. 21 and FIG. 22, the transistors 258a and 258b are turned on in a unit area 256 situated at the intersection between the vertical scan control line Lv receiving the voltage V2 and the horizontal scan control line Lh receiving the voltage V2 in a video signal output period Th on a horizontal scan. The cathodes 253 of this unit area 256 thus emit electrons.

The emitted electrons are drawn out towards the photoelectric conversion film 230 as shown in FIG. 17 by the mesh electrode 240 set at high voltage that is higher than the voltage Vx applied to the gate electrodes 255A. Electrons arriving at the photoelectric conversion film 230 and holes accumulated in the photoelectric conversion film 230 are coupled with each other, so that an electric current flows through the external circuit 610 via the translucent conductive film 220. This electric current is detected as an output signal, which is amplified and processed by the signal amplifying and processing circuit 300 to produce a video signal responsive to an incident light image.

When all the holes accumulated in the photoelectric conversion film 230 are read by use of electrons emitted from the electron emission array 250A, the potential of the photoelectric conversion film 230 on the side closer to the electron emission array 250A is reset to the potential (0 V) of the cathodes 253 that is used at the time of electron emission in the video signal output period Th on a horizontal scan.

Upon subsequent entry of light into the photoelectric conversion film 230, holes generated by the light are accumulated in the photoelectric conversion film 230 on the side closer to the electron emission array 250, resulting in an increase of potential at the corresponding position.

In the horizontal blanking period Thb, also, the transistors 258*a* and 258*b* are turned on in a unit area 256 situated at the intersection between the vertical scan control line Lv receiving the voltage V2 and the horizontal scan control line Lh receiving the voltage V2. The cathodes 253 of this unit area 256 thus emit electrons.

As shown in FIG. 21, the voltage V2 is applied to the vertical scan control line Lv(J−1) corresponding to the horizontal scan line SHL(J−1), for which the amplitude of an output video signal has exceeded the threshold, in a horizontal blanking period Thb3 immediately following the period during which a video signal is output from the horizontal scan line SHL(J−1). On the other hand, voltage V1 is applied in each horizontal blanking period Thb to the vertical scan control line Lv(J+1) corresponding to the horizontal scan line SHL(J+1) for which the amplitude of an output video signal has not exceeded the threshold.

As shown in FIG. 22, the voltage V2 is applied in the horizontal blanking period Thb3 to the horizontal scan control lines Lh(N−1) through Lh(N+1) corresponding to the unit areas 256 for which the amplitude of an output video signal exceeds the threshold. Also, the voltage V1 is applied in each horizontal blanking period Thb to the horizontal scan control lines Lh corresponding to the unit areas 256 for which the amplitude of an output video signal does not exceed the threshold.

The pulse voltages as described above are applied to the vertical scan control lines Lv and the horizontal scan control lines Lh to emit electrons in the horizontal blanking period Thb3 from the cathodes 253 of a unit area 256 situated at each of the intersections between the vertical scan control line Lv(J−1) and the horizontal scan control lines Lh(N−1) through Lh(N+1). That is, electrons are emitted from an element for which the amplitude of an output video signal has exceeded the threshold.

Further, the potential of the cathodes 253 is maintained at 0 V at the time of electron emission in the horizontal blanking period Thb3. The electrons emitted from the cathodes 253 thus serves to electively remove only holes remaining in a portion of the photoelectric conversion film 230 after a video signal is output from this portion of the photoelectric conversion film 230 illuminated by highly bright light.

In the above-described drive method, the voltage Vx applied to the gate electrode 255A in the horizontal blanking period Thb3 is identical to the voltage Vx applied to the gate electrode 255A in each video signal output period. Alternatively, a voltage different from the voltage Vx may be applied to the gate electrode 255A in the horizontal blanking period Thb3 by utilizing the gate-voltage control circuit 424 of the vertical drive circuit 420A.

Figure 23:
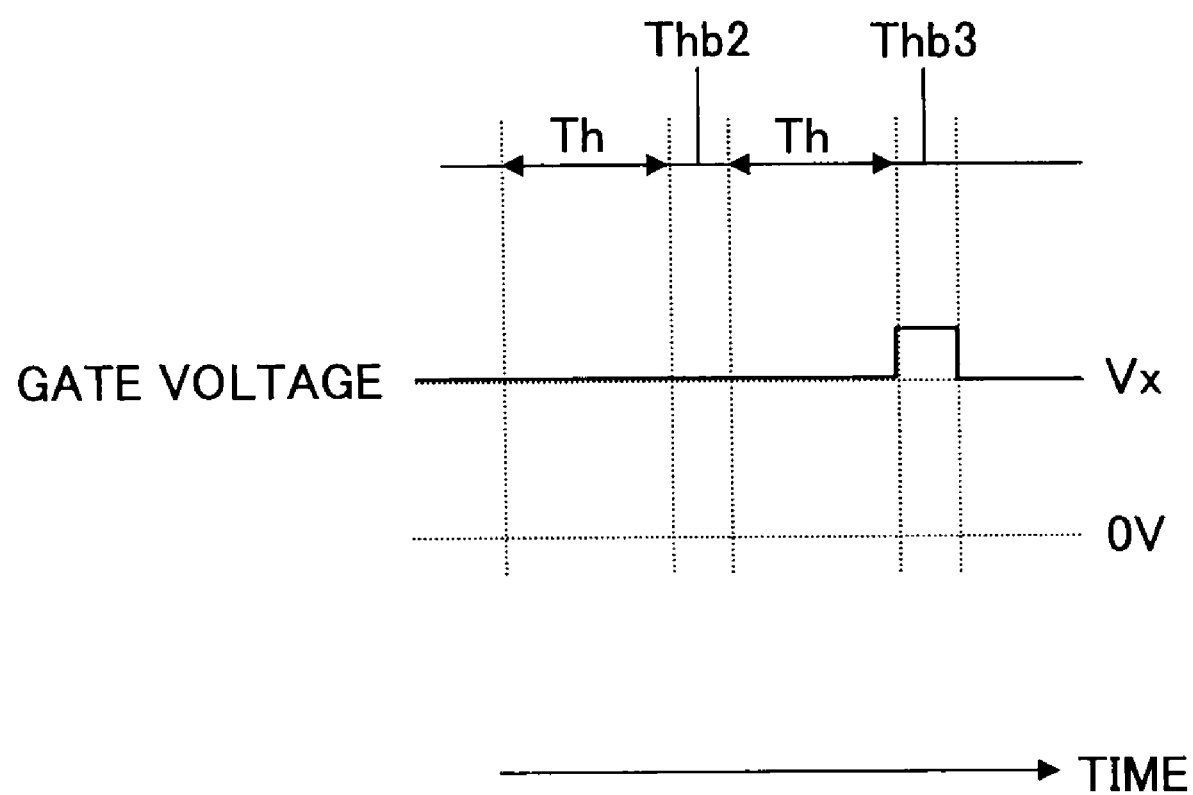
FIG. 23 is a drawing showing the amplitude and timing of pulse voltages applied to the gate electrode in the imaging apparatus of the second embodiment.

Especially when a voltage higher than the voltage Vx is applied to the gate electrode 255A in the horizontal blanking period Thb3 as shown in FIG. 23, an increased amount of electrons can be emitted from the elements for which the amplitude of an output video signal exceeds the threshold. In this case, holes remaining in the photoelectric conversion film 230 immediately following a scan can be removed even when extremely bright light enters the photoelectric conversion film 230.

Figure 24:
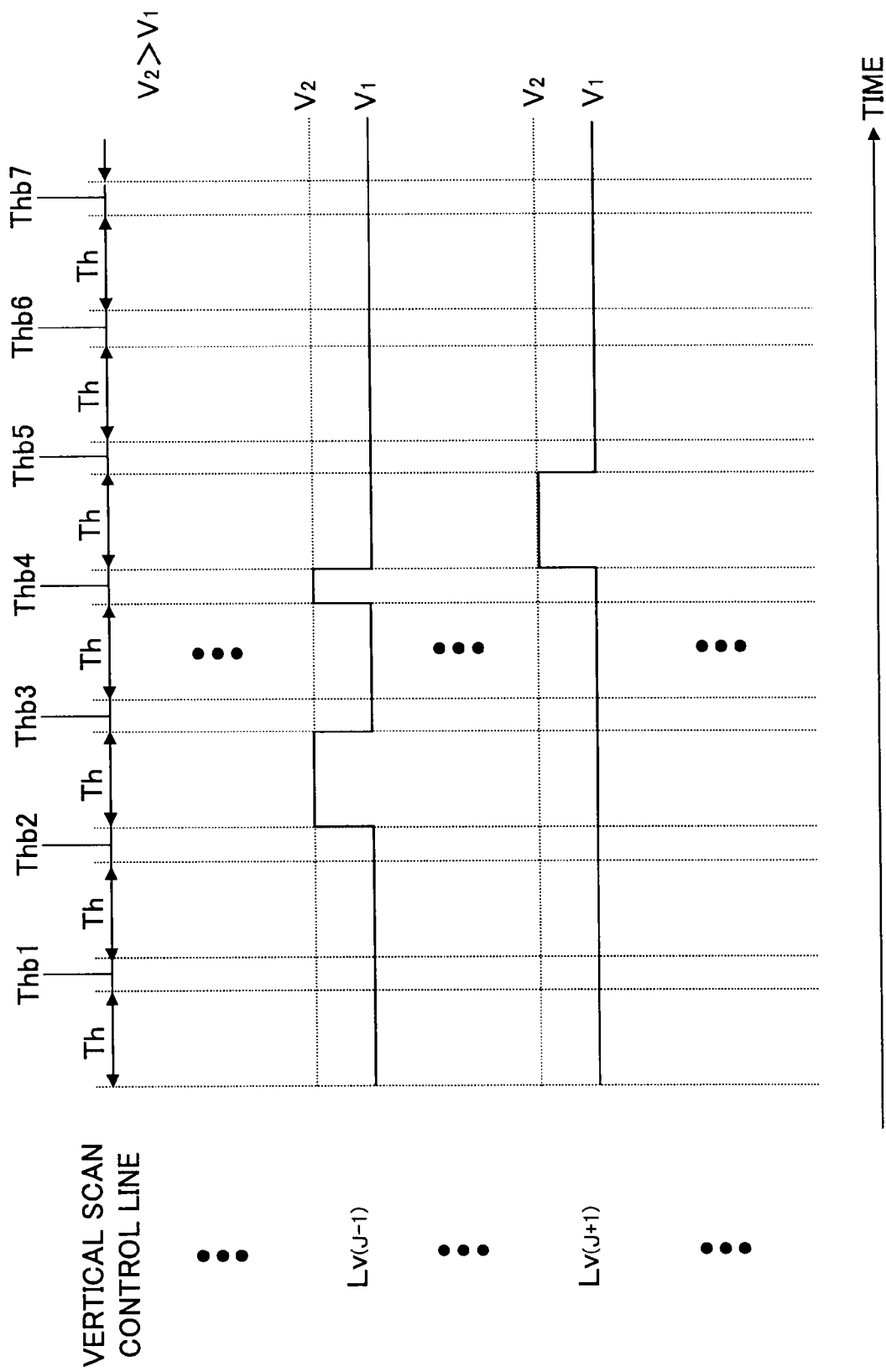
FIG. 24 is a drawing showing the amplitude and timing of other pulse voltages applied to the vertical scan control lines Lv of the imaging apparatus of the second embodiment.
Figure 25:
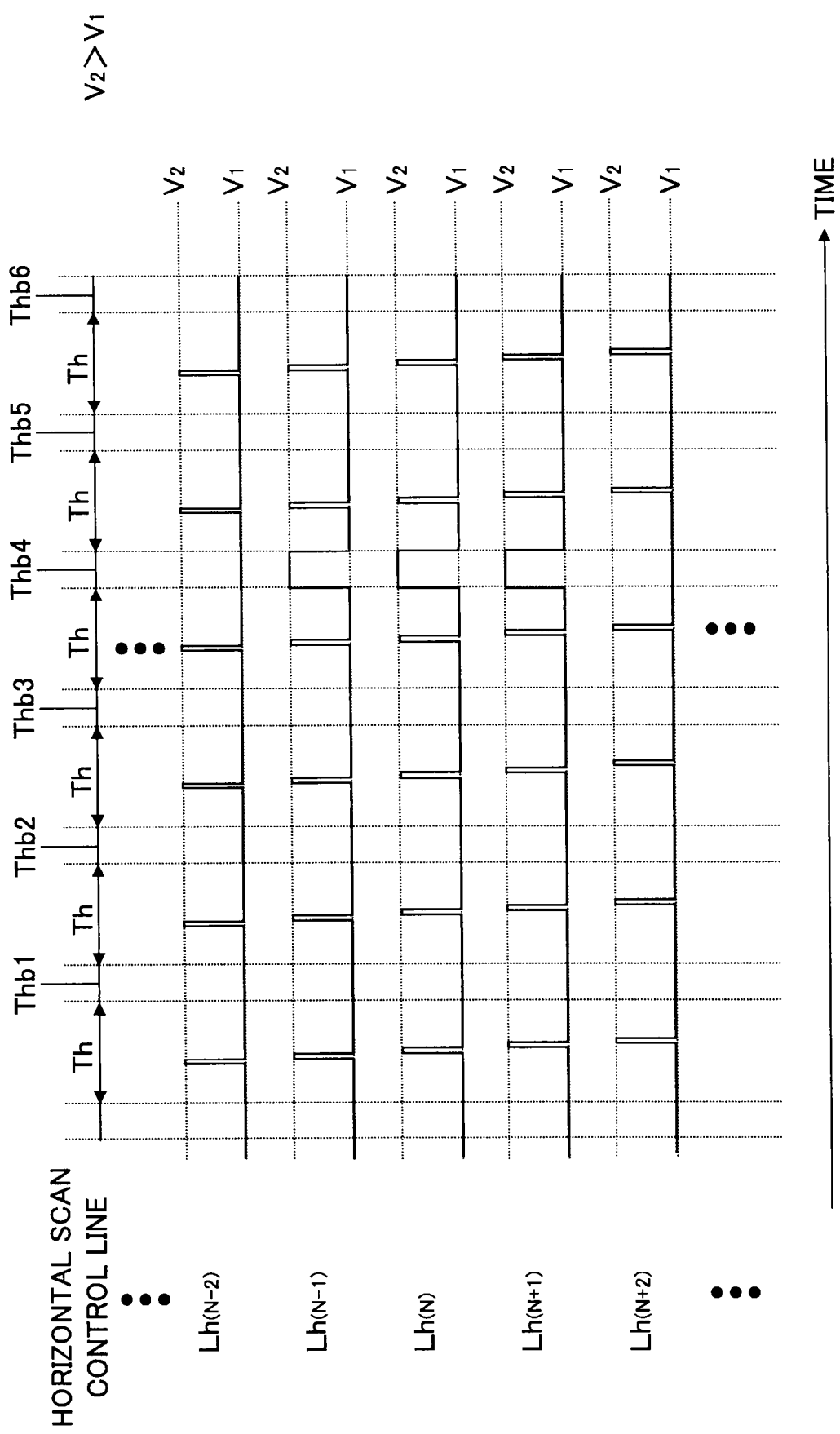
FIG. 25 is a drawing showing the amplitude and timing of other pulse voltages applied to the horizontal scan control lines Lh of the imaging apparatus of the second embodiment.

The operation performed through the application of voltage pulses shown in FIG. 21 and FIG. 22 has been directed to an example in which an element for which the amplitude of an output video signal has exceeded the threshold emits electrons in the horizontal blanking period Thb3 immediately following the outputting of the video signal to remove holes remaining in the opposite photoelectric conversion film 230. Alternatively, pulse voltages as shown in FIG. 24 may be applied to the vertical scan control lines Lv, and pulse voltages as shown in FIG. 25 may be applied to the horizontal scan control lines Lh, thereby emitting electrons in the horizontal blanking period Thb4 following the horizontal blanking period Thb3.

This drive method can suppress a significant sensitivity drop and pixel-specific sensitivity variation that are caused by reading holes from a portion of the photoelectric conversion film 230 when electrons emitted in a horizontal blanking period Thb are bent by bending towards this portion of the photoelectric conversion film 230 immediately prior to the outputting of a video signal. The occurrence of residual images can thus be avoided upon entry of highly bright light into the photoelectric conversion film 230 without degrading image quality.

Figure 26:
FIG. 26 is a drawing showing the amplitude and timing of other pulse voltages applied to the vertical scan control lines Lv of the imaging apparatus of the second embodiment.

Alternatively, pulse voltages as shown in FIG. 26 may be applied to the vertical scan control lines Lv, and pulse voltages as shown in FIG. 27 may be applied to the horizontal scan control lines Lh, thereby emitting electrons in the horizontal blanking period Thb4 and the horizontal blanking period Thb5 from the elements for which the amplitude of an output video signal has exceeded the threshold.

This arrangement can remove holes remaining in the photoelectric conversion film 230 even when extremely bright light enters the photoelectric conversion film 230.

The operation performed through the application of voltage pulses shown in FIG. 21 and FIG. 22 has been directed to an example in which each of the elements for which the amplitude of an output video signal has exceeded the threshold emits the same amount of electrons in the horizontal blanking period Thb3 immediately following the outputting of the video signal. Provision may be made such that pulse voltages shown in FIG. 28, in place of the pulse voltages shown in FIG. 22, are applied to the horizontal scan control lines Lh. The duration of the voltage V2 applied to the horizontal scan control lines Lh(N−1) through Lh(N+1) in the horizontal blanking period Thb3 is controlled in this case according to the amplitudes of the output video signals exceeding the threshold.

In the drive method described above, the duration of electron emission from a pertinent element in the horizontal blanking period Thb3 increases with an increase in the amplitude of a corresponding output video signal exceeding the threshold. Conversely, the duration of electron emission from a pertinent element in the horizontal blanking period Thb3 decreases with a decrease in the amplitude of a corresponding output video signal exceeding the threshold. With this arrangement, the occurrence of residual images is prevented upon entry of highly bright light into the photoelectric conversion film 230 while further reducing the load on the electron emission array 250A.

It should be noted that, in the above-described operation, electrons emitted in the horizontal blanking period Thb in response to the amplitude of an output video signal are used to remove holes remaining in the photoelectric conversion film 230. There is thus a delay in control. When a highly bright luminous object in motion is filmed, for example, there is a risk of suffering the occurrence of residual images.

There is thus a need to prevent the occurrence of residual images and the degradation of image resolution attributable to a delay in the output-video-signal-based control of electron emission in the horizontal blanking period Thb. To this end, electrons are emitted in the horizontal blanking period Thb also from the elements for which the amplitude of an output video signal has not exceeded the threshold. Further, the duration of electron emission in the horizontal blanking period Thb is controlled in response to the amplitude of an output video signal with respect to the elements for which the amplitude of an output video signal has exceeded the threshold and the elements for which the amplitude of an output video signal has not exceeded the threshold.

FIG. 29 is a drawing showing the amplitude and timing of pulse voltages applied to the vertical scan control lines Lv in order to achieve the above-described driving method. FIG. 30 is a drawing showing the amplitude and timing of pulse voltages applied to the horizontal scan control lines Lh in order to achieve the above-described driving method.

With the application of these voltage pulses to the vertical scan control lines Lv and the horizontal scan control lines Lh, electrons are emitted in the horizontal blanking period Thb from the elements for which the amplitude of an output video signal has exceeded the threshold and from the elements for which the amplitude of an output video signal has not exceeded the threshold. Further, the elements for which the amplitude of an output video signal has exceeded the threshold emit electrons for a longer duration than do the elements for which the amplitude of an output video signal has not exceeded the threshold.

This serves to prevent the occurrence of residual images attributable to a delay in the output-video-signal-based control of electron emission in the horizontal blanking period Thb when there is highly bright incident light.

The above-described embodiment has been directed to a configuration in which electrons are emitted in the horizontal blanking period Thb from the elements for which the amplitude of an output video signal has exceeded the threshold, thereby removing holes remaining in the photoelectric conversion film 230 at the opposite position. In place of the pulse voltages applied to the horizontal scan control lines Lh as shown in FIG. 22, FIG. 25, or FIG. 27, pulse voltages shown in FIG. 31 may be applied to the horizontal scan control lines Lh.

With this arrangement, all the elements belonging to the horizontal scan line 257 for which the amplitude of an output video signal has exceeded the threshold emit electrons in the horizontal blanking period Thb. This makes it possible to perform the control of electron emission on a horizontal-scan-line-specific basis in the horizontal blanking period Thb according to the amplitude of an output video signal.

Alternatively, pulse voltages as shown in FIG. 31 may be applied to the horizontal scan control lines Lh, and pulse voltages as shown in FIG. 32 may be applied to the vertical scan control lines Lv. In this case, the number of horizontal blanking periods Thb in which the voltage V2 is applied is greater for the vertical scan control line Lv(J−1) corresponding to the horizontal scan line SHL(J−1) for which the amplitude of an output video signal has exceeded the threshold, and is smaller for the vertical scan control line Lv(J+1) corresponding to the horizontal scan line SHL(J+1) for which the amplitude of an output video signal has not exceeded the threshold.

This serves to perform the control of electron emission on a horizontal-scan-line-specific basis in the horizontal blanking period Thb according to the amplitude of an output video signal. Further, the occurrence of residual images attributable to a delay in the output-video-signal-based control of electron emission can be prevented.

It should be noted that with the application of pulse voltages shown in FIG. 29 and FIG. 30 or pulse voltages shown in FIG. 31 and FIG. 32, part of holes generated and accumulated in the photoelectric conversion film 230 in response to incident light are also removed in the horizontal blanking period Thb in addition to residual holes remaining in the photoelectric conversion film 230. The effective sensitivity thus drops. Such a sensitivity drop can be compensated for by use of a highly sensitively photoelectric conversion film 230 utilizing the avalanche amplification of optically generated electric charge in a semiconductor having amorphous selenium (Se) or amorphous silicon (Si) as a main component. The creation of residual images in response to entry of highly bright light into the photoelectric conversion film 230 can thus be effectively prevented.

In the above descriptions of the imaging apparatus of the first and second embodiments, no mention has been made of a vertical blanking period. A portion of the vertical blanking period may be regarded as a horizontal blanking period to achieve the same advantages as those of the above-described embodiments.

The descriptions of the imaging apparatus of exemplary embodiments have been provided heretofore. The present invention is not limited to these embodiments, but various variations and modifications may be made without departing from the scope of the present invention.

The present application is based on Japanese priority application No. 2007-134790 filed on May 21, 2007, with the Japanese Patent Office, the entire contents of which are hereby incorporated by reference.

What is claimed is:

1. An imaging apparatus, comprising:
    an electron emission array having electron sources arranged in matrix form and having a plurality of horizontal scan lines;
    a photoelectric conversion film opposed to the electron emission array; and
    a control and drive circuit configured to select one or more of the horizontal scan lines in a given video signal output period and to cause the electron sources included in the selected one or more horizontal scan lines to emit electrons toward the photoelectric conversion film to produce a video signal,
    wherein the control and drive circuit is configured to control electron emission of the electron emission array in a blanking period in response to a signal level of the video signal produced in the given video signal output period.

2. The imaging apparatus as claimed in claim 1, wherein the control and drive circuit is configured to select, in response to the signal level of the video signal produced in the given video signal output period, one or more of the electron sources that emit electrons in the blanking period.

3. The imaging apparatus as claimed in claim 1, wherein the control and drive circuit is configured to select, in response to the signal level of the video signal produced in the given video signal output period, one or more of the horizontal scan lines including electron sources that emit electrons in the blanking period.

4. The imaging apparatus as claimed in claim 1, wherein the control and drive circuit is configured to control a duration of the electron emission of the electron emission array in the blanking period in response to the signal level of the video signal produced in the given video signal output period.

5. The imaging apparatus as claimed in claim 1, wherein the control and drive circuit is configured to control, in response to the signal level of the video signal produced in the given video signal output period, a number of blanking periods in which the electron emission array emits electrons between the given video signal output period and a next video signal output period in which the selected one or more horizontal scan lines will be selected next time.

6. The imaging apparatus as claimed in claim 1, wherein the electron emission array includes a first electrode for emitting electrons and a second electrode for creating a potential gap with the first electrode, and a potential gap is created between the first electrode and the second electrode to draw out electrons from the first electrode in the given video signal output period and in the blanking period.

7. The imaging apparatus as claimed in claim 6, wherein at least one of the first electrode and the second electrode receives a first voltage in the blanking period, and receives a second voltage different from the first voltage in the given video signal output period.

8. The imaging apparatus as claimed in claim 6, wherein the potential gap created between the first electrode and the second electrode in the blanking period is controlled in response to the signal level of the video signal produced in the given video signal output period.

9. The imaging apparatus as claimed in claim 1, wherein the photoelectric conversion film receives a first voltage in the blanking period, and receives a second voltage different from the first voltage in the given video signal output period.

* * * * *

UNITED STATES PATENT AND TRADEMARK OFFICE
CERTIFICATE OF CORRECTION

PATENT NO. : 7,723,664 B2
APPLICATION NO. : 12/123987
DATED : May 25, 2010
INVENTOR(S) : Yuki Honda et al.

Page 1 of 1

It is certified that error appears in the above-identified patent and that said Letters Patent is hereby corrected as shown below:

On the title page, Item (73), the Assignees' information is incorrect. Item (73) should read:

-- (73) Assignees: Nippon Hoso Kyokai, Tokyo (JP); Hamamatsu Photonics K.K., Hamamatsu-shi (JP); Futaba Corporation, Chiba (JP); Pioneer Corporation, Tokyo (JP) --

Signed and Sealed this
Seventeenth Day of May, 2011

David J. Kappos
*Director of the United States Patent and Trademark Office*